United States Patent
Duttagupta et al.

(10) Patent No.: US 10,747,778 B2
(45) Date of Patent: Aug. 18, 2020

(54) REPLICATION OF DATA USING CHUNK IDENTIFIERS

(71) Applicant: Cohesity, Inc., Santa Clara, CA (US)

(72) Inventors: Anirvan Duttagupta, San Jose, CA (US); Apurv Gupta, Bangalore (IN); Dinesh Pathak, Bangalore (IN)

(73) Assignee: Cohesity, Inc., San Jose, CA (US)

( * ) Notice: Subject to any disclaimer, the term of this patent is extended or adjusted under 35 U.S.C. 154(b) by 295 days.

(21) Appl. No.: 15/664,738

(22) Filed: Jul. 31, 2017

(65) Prior Publication Data
US 2019/0034507 A1  Jan. 31, 2019

(51) Int. Cl.
| | |
|---|---|
| *G06F 16/27* | (2019.01) |
| *G06F 16/22* | (2019.01) |
| *G06F 16/18* | (2019.01) |
| *G06F 16/174* | (2019.01) |

(52) U.S. Cl.
CPC .......... *G06F 16/27* (2019.01); *G06F 16/1752* (2019.01); *G06F 16/1873* (2019.01); *G06F 16/2246* (2019.01)

(58) Field of Classification Search
CPC ............... G06F 16/27; G06F 16/2246; G06F 17/30575; G06F 17/30067; G06F 17/30286; G06F 17/30008; G06F 11/1451; G06F 16/174; G06F 16/1748; G06F 16/1752; G06F 16/1873
See application file for complete search history.

(56) References Cited

U.S. PATENT DOCUMENTS

| | | | | |
|---|---|---|---|---|
| 5,758,347 | A * | 5/1998 | Lo ........................... | G06F 16/00 |
| 6,957,362 | B2 * | 10/2005 | Armangau .......... | G06F 11/1469 |
| | | | | 714/15 |
| 7,035,881 | B2 * | 4/2006 | Tummala ................ | G06F 16/10 |
| | | | | 707/639 |
| 7,039,663 | B1 * | 5/2006 | Federwisch ......... | G06F 11/1451 |
| 8,412,688 | B1 * | 4/2013 | Armangau ............ | G06F 16/128 |
| | | | | 707/695 |
| 8,515,911 | B1 * | 8/2013 | Zhou ................... | G06F 16/1873 |
| | | | | 707/638 |
| 9,223,793 | B1 * | 12/2015 | Mahalingam ....... | G06F 16/1748 |
| 2008/0059541 | A1 * | 3/2008 | Fachan ................. | G06F 16/174 |

(Continued)

OTHER PUBLICATIONS

Written Opinion of the International Search Authority for PCT/US18/39852, dated Feb. 7, 2019, 5 pages (Year: 2019).*

*Primary Examiner* — James E Richardson
(74) *Attorney, Agent, or Firm* — Van Pelt, Yi & James LLP

(57) ABSTRACT

A data identifier for each data portion of a first group of different data portions of a first version of data is determined. The first version of the data is represented in a tree structure that references the determined data identifiers. A second version of the data is represented in a second tree structure using at least a portion of elements of the first tree structure of the first version. The second tree structure references one or more data identifiers of a portion of the second version of the data that is different from the first version of the data. The one or more data identifiers of the portion of the second version of the data that is different from the first version of the data are identified and sent. A response indicating which of the data portions corresponding to the sent one or more data identifiers are requested to be provided for replication is received.

19 Claims, 20 Drawing Sheets

(56) References Cited

U.S. PATENT DOCUMENTS

| | | | |
|---|---|---|---|
| 2008/0114951 A1* | 5/2008 | Lee | G06F 11/1469 |
| | | | 711/162 |
| 2009/0265516 A1 | 10/2009 | Prabhu | |
| 2010/0094817 A1* | 4/2010 | Ben-Shaul | G06F 3/0608 |
| | | | 707/697 |
| 2010/0223593 A1 | 9/2010 | Eldridge | |
| 2013/0066931 A1 | 3/2013 | Lacapra | |
| 2013/0332558 A1* | 12/2013 | Condict | G06F 3/0641 |
| | | | 709/214 |
| 2014/0040199 A1* | 2/2014 | Golab | G06F 16/219 |
| | | | 707/634 |
| 2016/0156474 A1 | 6/2016 | Gschwind | |
| 2018/0025026 A1* | 1/2018 | Shaw, Jr. | G06F 16/178 |
| | | | 707/626 |

\* cited by examiner

REPLICATION OF DATA USING CHUNK IDENTIFIERS

BACKGROUND OF THE INVENTION

Often, file system data needs to be replicated from one site to another site. The replicated data may be comprised of large amounts of data (e.g., gigabytes, terabytes, petabytes, etc.). However, merely copying data from one site to another takes a long period of time. It is also possible that copying the data may cause the other site to store duplicative data. Thus, a faster and more efficient way to replicate data is needed.

BRIEF DESCRIPTION OF THE DRAWINGS

Various embodiments of the invention are disclosed in the following detailed description and the accompanying drawings.

DETAILED DESCRIPTION

Figure 1:
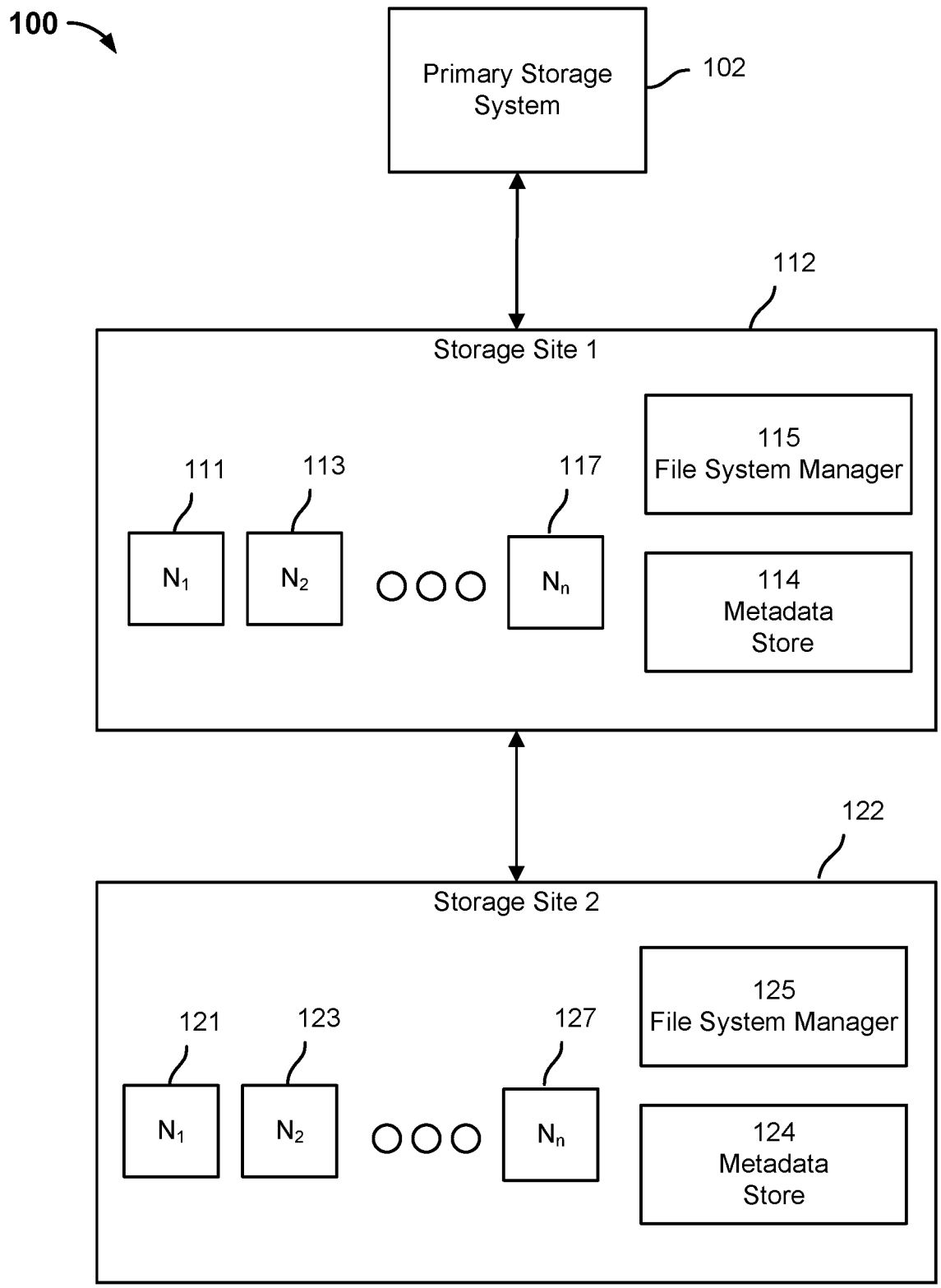
FIG. 1 is a block diagram illustrating an embodiment of a system for replicating data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Replication of file system data is disclosed. There are many solutions to make data replication faster and more efficient. One possible solution is to track one or more blocks of the file system data that have been previously replicated, identify one or more blocks of file system data that have not been previously replicated, and send the one or more blocks of file system data that have not been previously replicated to the second storage site. However, performing a block by block comparison of file system data is computationally expensive because the size of the file system data to be replicated may be very large (e.g., gigabytes, terabytes, petabytes, etc.).

File system data can be remotely replicated to a remote storage site. In some embodiments, a version of file system data is comprised of one or more blocks that are segmented into one or more chunks of data, a chunk identifier is computed for each chunk of data, and the chunk identifiers are stored as file system metadata. Each time a version of file system data is modified, the file system metadata between versions can be compared, and the one or more data chunks that are new (e.g., due to added data or modification of data) in a version can be identified. The chunk identifiers associated with the one or more new data chunks may be initially sent to the second storage site without initially sending the actual content of the new data chunks. In response to receiving the chunk identifiers, the second storage site may compare the chunk identifiers to a list of chunk identifiers associated with data chunks already stored at the second storage site, and send to the first storage site a request for data chunks that are not already stored at the second storage site. In response to the request, the first storage site may send the requested data chunks. This prevents the first storage site from sending duplicate data chunk from previous backup snapshots to the second storage site.

In some embodiments, file system data is organized using a tree data structure and the tree data structure is used when replicating data from a first storage site to a second storage site. A tree data structure is utilized to organize and store file system data. The tree data structure provides an efficient way to identify chunk identifiers associated with new data chunks and may be utilized to prevent chunk identifiers associated with previously replicated data chunks from being sent to the second storage site. An example of the tree data structure is a snapshot tree (e.g., Cohesity Snaptree), which may be based on a B+ tree structure (or other type of tree structure in other embodiments). The snapshot tree can be used to capture different versions of file system data at different moments in time. The snapshot tree may also efficiently locate desired metadata by traversing a particular snapshot version, i.e., a particular snapshot tree. In some embodiments, the tree data structure allows a chain of snapshot trees (i.e. different snapshot tree versions) to be linked together by allowing a node of a later version of a snapshot tree to reference a node of a previous version of a snapshot tree (e.g., a "snapshot tree forest"). A snapshot tree includes a root node, one or more levels of one or more intermediate nodes associated with the root node, and one or more leaf nodes associated with each intermediate node of the lowest intermediate level. For example, a root node or an intermediate node of a version of a snapshot tree may reference an intermediate node or a leaf node of a previous version of a snapshot tree. The root node of a snapshot tree includes one or more pointers to one or more intermediate nodes. Each intermediate node includes one or more pointers to other nodes (e.g., a lower level intermediate node or a leaf node). Each time a snapshot is performed, a new root node is created and the new root node includes the set of pointers included in the previous root node, that is, the new root node includes one or more pointers to an intermediate node or leaf node associated with a previous snapshot tree. The new root node also includes a view identifier (e.g., treeID) that is different than the view identifier of the previous root node. The view identifier associated with a node identifies a view with which the node is associated. A leaf node may store file system metadata, a data chunk, an identifier of a data chunk, or a pointer to a file tree. For example, the file system metadata may include a chunk identifier associated with a data chunk. The chunk identifier is a value that uniquely identifies the data chunk with which the chunk identifier is associated. The file tree represents the data chunks in a tree structure.

A snapshot of the system captures a view of the file system data at a particular moment in time. The view may be a current view or a snapshot view. A current view may represent a state of the file system data that is up-to-date and capable of receiving one or more modifications to the snapshot tree that correspond to modifications to the file system data. A snapshot view may represent a state of the file system data at a particular moment in time in the past and is not updated. The view of a snapshot may change from a current view to a snapshot view when a subsequent snapshot is performed. For example, a snapshot at t=1 may be a current view and accept one or more modifications to the snapshot tree. When another snapshot is performed at t=2, another root node is added to the snapshot tree. The snapshot associated with t=1 at t=2 becomes a snapshot view and the snapshot at t=2 is a current view of the snapshot tree.

File system data may be segmented into a plurality of data bricks. A data brick may be comprised of one or more data chunks. Each data chunk may be identified by a corresponding chunk identifier. As a result, the file system data may be represented as a plurality of chunk identifiers organized into data bricks.

In some embodiments, the file system data may be modified such that one of the data chunks corresponding to the modified portion of the file system data is replaced by another data chunk reflecting the modification. When a data chunk of file system data associated with a previous snapshot is replaced with a new data chunk, the chunk identifier associated with the data chunk of a previous snapshot may no longer apply to the file system data. A leaf node of a snapshot tree stores a chunk identifier associated with a particular data chunk. To represent this modification to the file system data, a corresponding modification is made to a current view of a snapshot in the snapshot tree. The current view of the snapshot tree is modified because the previous snapshot is a snapshot view and can no longer be modified. The data chunk of the file system data that was replaced has a corresponding leaf node in the previous snapshot. A new leaf node in the current view of the snapshot is created, as described herein, that corresponds to the new data chunk. The new leaf node includes a view identifier associated with the current view of the snapshot tree. The new leaf node may also store the chunk identifier associated with the modified data chunk.

In other embodiments, a write to the file system data may occur such that a portion of a data chunk corresponding to the modified portion of the file system data is overwritten with a new data chunk reflecting the modification. As a result, the chunk identifier associated with the data chunk applies to a portion of the modified file system data and the chunk identifier associated with the new data chunk applies to the portion of the file system data that previously corresponded to the overwritten portion of the data chunk. To represent this modification to the file system data, a corresponding modification is made to a current view of a snapshot in the snapshot tree. The current view of the snapshot is modified because the previous snapshot is a snapshot view and can no longer be modified. The data chunk of the file system has a corresponding leaf node in the previous snapshot. A new leaf node is added to the current view of the snapshot, as described herein, which corresponds to the modified file system data. The new leaf node includes a view identifier associated with the current view of the snapshot tree. The new leaf node also stores metadata that describes the modification. The new leaf node may include the chunk identifier associated with the data chunk, a corresponding chunk offset that describes a portion of the data chunk with which the chunk identifier still applies, a length of the corresponding chunk offset that describes a portion of the data chunk with which the chunk identifier still applies, a chunk identifier associated with the new data chunk, a corresponding chunk offset that describes the portion of the new data chunk with which the chunk identifier applies, and/or a length of the corresponding chunk offset that describes the portion of the new data chunk with which the chunk identifier applies. In some embodiments, the metadata may also include a file offset for each chunk identifier that identifies a portion of the file system data with which the chunk identifier applies. In some embodiments, the metadata may also include a file offset length for each chunk identifier that identifies a length of the portion of the file system data with which the chunk identifier applies.

In some embodiments, when data is to be replicated from a first storage site to a second storage site, the snapshot tree associated with a particular view is traversed to determine one or more new chunks of data associated with the file system data. In some embodiments, the snapshot tree is traversed from a root node associated with the particular view to each of the leaf nodes of the particular view. The new chunks of data are determined based on the leaf node view identifier. In the event the leaf node of a particular view includes a view identifier associated with the particular view, then the leaf node is a node that has been added since a previous snapshot. In the event the leaf node of a particular view does not include a view identifier associated with the particular view, then the leaf node is a node associated with a previous snapshot. In some embodiments, the chunk identifiers included in the one or more leaf nodes associated with the particular view are determined and sent to the second storage site. In other embodiments, the chunk identifiers and corresponding offsets included in the one or more leaf nodes associated with the current view are determined and sent to the second storage site. In other embodiments, the snapshot tree and a previous snapshot tree are traversed from respective root nodes to each of the leaf nodes associated with the snapshot tree and the previous snapshot tree. The shared leaf nodes between the snapshot trees are determined. The non-shared leaf nodes between the snapshot trees are also determined. The chunk identifiers included in the one or more leaf nodes that are not shared between the snapshot trees may be sent to the second storage site. The chunk identifiers and corresponding offsets included in the one or more leaf nodes that are not shared between the snapshot trees may be sent to the second storage site.

In response to receiving the chunk identifiers, the second storage site may compare the chunk identifiers to a list of chunk identifiers associated with data chunks already stored at the second storage site, and send to the first storage site a request for data chunks that are not already stored at the second storage site. The first storage site may invoke a remote procedure call that includes the chunk identifiers and a result of the remote procedure call indicates the data chunks that are not already stored at the second storage site. The first storage site may send the data chunks that are not already stored at the second storage site. The second storage site may also update a metadata store with the received offsets. This allows the file system data and corresponding snapshot tree structure to be accurately reproduced at the second storage site. Representing the file system data in a tree data structure allows new data chunks and associated chunk identifiers to be easily identified. It also prevents the first storage site from sending duplicative chunk identifiers from previous versions of the file system data.

A replication policy may indicate that the file system data stored at the first storage site is to be replicated to the second storage site. In some embodiments, a replication policy indicates that the file system data is to be replicated on a periodic basis (e.g., hourly, daily, weekly, monthly, etc.) or on an on-demand basis (e.g., command from user associated with the primary storage system or the secondary storage system). In some embodiments, a replication policy indicates that the file system data is to be replicated each time a snapshot tree is added to the tree data structure. In some embodiments, the replication policy may indicate that a full snapshot and/or an incremental snapshot of the file system data is to be replicated to the second storage site. A full snapshot includes the data stored in each of the leaf nodes of a snapshot tree view, regardless of whether the leaf nodes of the snapshot tree view are shared with a previous snapshot tree view. The chunk identifiers associated with each of the leaf nodes of the snapshot may be sent to the second storage site, which may request one or more data chunks associated with the sent chunk identifiers; the one or more data chunks being data chunks not already stored at the second storage site. An incremental snapshot includes data stored in one or more leaf nodes of a snapshot tree view that are not shared with a previous snapshot tree view. The chunk identifiers associated with each of the leaf nodes of the snapshot of a snapshot tree view that are not shared with a previous snapshot tree view may be sent to the second storage site, which may request one or more data chunks associated with the sent chunk identifiers; the one or more data chunks being data chunks not already stored at the second storage site.

Instead of scanning blocks of file system data to determine what is new and sending the new blocks of data to the second storage site, it is more efficient to traverse a tree data structure that represents the blocks to file system data to determine a list of chunk identifiers that correspond to the new/changed data chunks, to send a list of chunk identifiers that represent the new/changed chunks of data to the second storage site, and for the second storage site to request data blocks that were not previously replicated. It is also more efficient to traverse a snapshot tree and a previous snapshot tree, determine the shared nodes, determine the non-shared nodes, and to send a list of chunk identifiers associated with the non-shared nodes. This reduces the amount of time needed to replicate data. Additionally, because the chunk identifier is smaller is data size than the contents of the chunk it identifies, network bandwidth is conserved.

FIG. 1 is a block diagram illustrating an embodiment of a system for replicating data. In the example shown, system 100 includes primary storage system 102, a first storage site 112, and a second storage site 122.

Primary storage system 102 is a computing system that stores file system data. Primary storage system 102 may be comprised of one or more servers, one or more computing devices, one or more storage devices, and/or a combination thereof. Primary storage system 102 may be configured to backup file system data to first storage site 112 according to one or more backup policies. In some embodiments, a backup policy indicates that file system data is to be backed up on a periodic basis (e.g., hourly, daily, weekly, monthly, etc.). In other embodiments, a backup policy indicates that file system data is to be backed up when a threshold size of data has changed. In other embodiments, a backup policy indicates that file system data is to be backed up upon a command from a user associated with primary storage system 102.

First storage site 112 is a storage system configured to store file system data received from primary storage system 102. First storage site 112 may protect a large volume of applications while supporting tight business requirements (recovery time objective (RTO) and recovery point objective (RPO)). First storage site 112 may unify end-to-end protection infrastructure—including target storage, provide backup, replication of data, disaster recovery, and/or cloud tiering. First storage site 112 may provide scale-out, globally deduped, highly available storage to consolidate all secondary data, including backups, files, and test/dev copies. First storage site 112 simplifies backup infrastructure and eliminates the need to run separate backup software, proxies, media servers, and archival. First storage site 112 may be fully integrated with a virtual machine (VM) centralized management tool, such as vCenter, and an applications programming interface (API) for data protection. First storage site 112 may reduce the amount of time $t_0$ perform RPOs and support instantaneous RTOs by creating a clone of a backup VM and running the VM directly from first storage site 112. First storage site 112 may integrate natively with one or more cloud servers. First storage site 112 may replicate data to a one or more cloud clusters to minimize potential data loss by replicating data as soon as a backup is completed. This allows data in the cloud to be used for disaster recovery, application migration, test/dev, or analytics.

First storage site 112 is configured to store the file system data in a tree data structure and to create a snapshot of the tree structure. The snapshot may be associated with a view at a particular moment in time. A view depicts the connections between nodes and the data stored in one or more leaf nodes at the particular moment in time.

First storage site 112 may be configured to replicate any of the file system data stored on first storage site 112 (e.g., tree data, other non-tree data) according to one or more replication policies. Replication provides for off-site data protection, disaster recovery, and application migrations. In some embodiments, a replication policy indicates that the file system data is to be replicated to a second storage site on a periodic basis (e.g., hourly, daily, weekly, monthly, etc.). In other embodiments, a replication policy indicates that data is to be replicated to a second storage site when a threshold size of data has changed. In other embodiments, a replication policy indicates that data is to be replicated to a second storage site upon a command from a user associated with first storage site 112. In other embodiments, a replication policy indicates that data is to be replicated to a second storage site when a snapshot of file system data is performed.

First storage site 112 may be comprised of one or more storage nodes 111, 113, 117. The one or more storage nodes may be one or more solid state drives, one or more hard disk drives, or a combination thereof. First storage site 112 may include one or more processors coupled to the storage drives and configured to replicate data stored in the storage drives to second storage site 122 and/or one or more other storage mediums (e.g. tape, removable storage). In one embodiment, first storage site 112 is comprised of one solid state drive and three hard disk drives.

First storage site 112 may include a metadata store 114. Metadata store 114 may include a data structure (e.g., table, list, etc.) that associates a chunk identifier with a data chunk. For example, metadata store 114 may include a table that identifies a chunk identifier (e.g., hash value) and the data chunk with which it is associated. The metadata store 114 may associate a chunk identifier with a physical location of the data chunk in storage. The metadata store 114 may store a file offset for a data chunk (e.g., 0-256 kb) and an offset length (e.g., 256 kb). The data chunk file offset may identify the bytes of the file system data where the data chunk applies. The offset length identifies a length of the data chunk. A file may be comprised of a plurality of chunks, each chunk corresponding to a plurality of bytes of the file. For example, a file may be a 512 kb size file. A data chunk may correspond to bytes 0-256 k of the file. The metadata store 114 may associate a chunk identifier with a chunk offset and a chunk length. The chunk offset describes a portion of a chunk with which the chunk identifier applies. The chunk length describes a length of the data chunk. For example, a chunk may have a length of 200 bytes and a chunk offset indicates that the chunk identifier applies to bytes 0-99 of the chunk. A chunk identifier may apply to any portion of a data chunk. For example, the chunk identifier may apply to a front portion, a middle portion, an end portion, or an entire portion of a data chunk.

In some embodiments, metadata store 114 may store a checkpoint that describes the state of data that has been replicated between the first storage site 112 and second storage site 122. The set of file system data to be replicated to a second storage site may be broken into a plurality of subsets of file system data. A storage node may be assigned to replicate one of the subsets to second storage site 122. Each subset of file system data may be divided into a plurality of batches. Each time a node finishes replicating a batch of file system data, the metadata store 114 may store a checkpoint of this replication. The checkpoint indicates a state of the file system data replication that has been completed. In some embodiments, the replication of data may be interrupted (e.g., node crash/failure). The checkpoint enables any other storage node of first storage site 112 to resume the data replication from the checkpoint.

First storage site 112 may include a file system manager 115. File system manager 115 is configured to maintain file system data in a tree structure. The tree data structure may include one or more leaf nodes that store a data key-value pair. A user may request a particular value by providing a particular data key to file system manager 115, which traverses a file system tree to find the value associated with the particular data key. A user may request a set of files within a particular range of data keys of a snapshot. File system manager 115 may be configured to perform a snapshot backup of a snapshot tree. File system manager 105 may be configured to perform one or more modifications, as disclosed herein, to a snapshot tree.

File system manager 115 may be configured to send a list of one or more chunk identifiers associated with a snapshot to second storage site 122. In some embodiments, the list of one or more chunk identifiers includes hash values associated with each of the leaf nodes of a snapshot. In other embodiments, the list of one or more chunk identifiers includes hash values associated with the leaf nodes having a view identifier associated with the snapshot tree view (i.e., new leaf nodes). File system manager 115 may be configured to send one or more blocks of data to data recovery storage system 122 upon request. File system manager 115 may be configured to invoke a remote procedure call that includes the list of one or more chunk identifiers associated with a snapshot and a result of the remote procedure call indicates chunk identifiers associated with data that is not currently stored at the second storage site.

Second storage site 122 is configured to store a replica of the data chunks stored in first storage site 112. Second storage site 122 may be configured to store a single copy of each data chunk to prevent duplicative data storage.

Second storage site 122 may be comprised of one or more storage nodes 121, 123, 127. The one or more storage nodes may be one or more solid state drives, one or more hard disk drives, or a combination thereof. Second storage site 122 may include one or more processors coupled to the storage drives. In one embodiment, data recovery storage system 122 is comprised of one solid state drive and three hard disk drives.

Second storage site 122 is configured to receive a list of one or more chunk identifiers from first storage site 112. Each chunk identifier corresponds to a data chunk. Instead of comparing the bits of data chunks to determine whether second storage site 122 already stores the data chunks, it is more efficient for second storage site 122 to compare the received list of one or more chunk identifiers to a list of chunk identifiers associated with data chunks already stored at second storage site 122. The list of chunk identifiers associated with data chunks already stored on second storage site 122 is stored in metadata store 124. Second storage site 122 is configured to send a request to first storage site 112 for one or more data chunks corresponding to the one or more chunk identifiers associated with data chunks that are not already stored in data recovery storage system 122. Second storage site 122 is configured to receive the data chunks and store them in one of the storage nodes.

Second storage site 122 includes a file system manager 125 that is configured to replicate the snapshot tree using the metadata stored in metadata store 125. File system manager 125 is configured to compare the list of received chunk identifiers to a list of chunk identifiers associated with data chunks already stored at second storage site 122. File system manager 125 is configured to provide the data chunks to the first storage site 112 for disaster recovery purposes. File system manager 125 is configured to provide the data chunks to another storage site to allow the other storage site to replicate the first storage site 112.

Figure 2A:
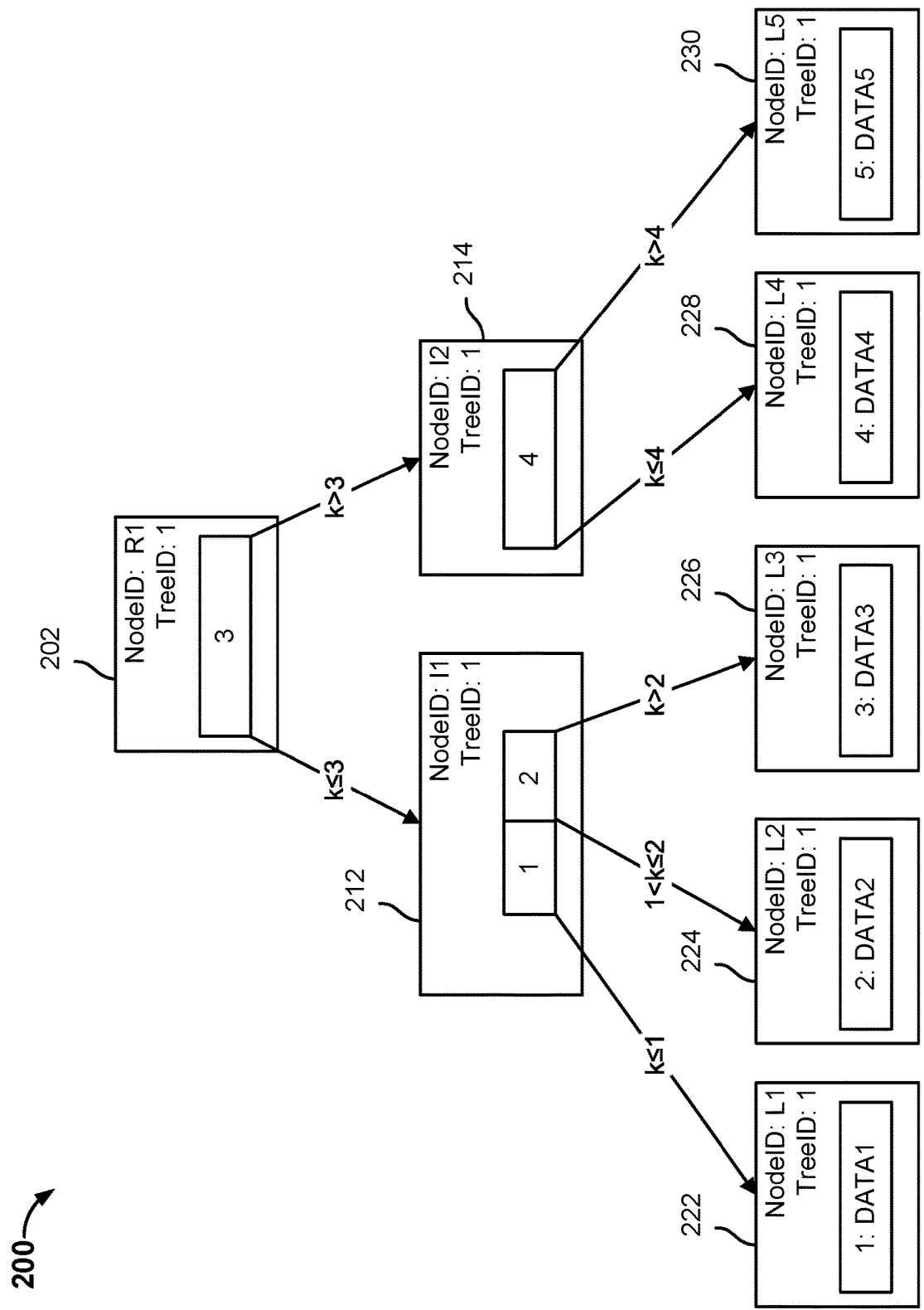
FIG. 2A is a block diagram illustrating an embodiment of a snapshot tree storing file system data.

FIG. 2A is a block diagram illustrating an embodiment of a snapshot tree storing file system data. In the example shown, snapshot tree 200 may be created by a storage system, such as first storage site 112. In the example shown, snapshot tree 200 includes a root node 202, intermediate nodes 212, 214, and leaf nodes 222, 224, 226, 228, and 230. Although snapshot tree 200 includes one intermediate level between root node 202 and leaf nodes 222, 224, 226, 228, 230, any number of intermediate levels may be implemented. Snapshot tree 200 may be a snapshot of file system data at a particular point in time t, for example at time $t_0$. In some embodiments, the file system data is metadata for a distributed file system and may include information, such as chunk identifier, chunk offset, file size, directory structure, file permissions, physical storage locations of the files, etc.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. A leaf node may be configured to store key-value pairs of file system data. Each node of the tree structure includes a view identifier of a view with which the node is associated (e.g., TreeID). A data key k is a lookup value by which a particular leaf node may be accessed. For example, "1" is a data key that may be used to lookup "DATA1" of leaf node 222. In some embodiments, the file system data is file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key. In other embodiments, a leaf node stores the actual data when the size of a file is less than or equal to a file size threshold. In some embodiments, a leaf node includes a pointer to a file tree that stores the data when the size of a file is larger than a file size threshold. In some embodiments, the leaf nodes are searched to determine the one or more chunk identifiers associated with the file. In other embodiments, the leaf nodes having a key associated with a chunk identifier value are searched to determine the one or more chunk identifiers associated with the file. In other embodiments, the leaf nodes having a view identifier (e.g., TreeID) that matches an identifier associated with a view of the snapshot tree are determined.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "3." To find a leaf node storing a value associated with a data key of "4" or "5," the second branch of root node 202 would be traversed to intermediate node 214 because data keys "4" and "5" are greater than the node key of "3."

In some embodiments, a hash function may determine which branch of a node with which the non-numerical key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "4." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing snapshot tree 200 from root node 202 to intermediate node 212 because the data keys have a value that is less than or equal to the node key. Leaf nodes with a data key of "4" or "5" may be found by traversing snapshot tree 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing snapshot tree 200 from root node 202 to intermediate node 212 will lead to a leaf node with a data key of "1," "2," or "3." Intermediate node 214 includes a second set of pointers. The second set of pointers associated with a data key greater than the node key indicates that traversing snapshot tree 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing snapshot tree 202 from intermediate node 212 to leaf node 222 will lead to the node with a data key of "1." The pointer to leaf node 224 indicates that traversing snapshot tree 202 from intermediate node 212 to leaf node 224 will lead to the node with a data key of "2." The pointer to leaf node 226 indicates that traversing snapshot tree 202 from intermediate node 212 to leaf node 226 will lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing snapshot tree 202 from intermediate node 214 to leaf node 228 will lead to the node with a data key of "4." The pointer to leaf node 230 indicates that traversing snapshot tree 202 from intermediate node 214 to leaf node 230 will lead the node with a data key of "5."

Leaf node 222 includes a data key-value pair of "1: DATA1." Leaf node 222 includes NodeID of "L1" and a TreeID of "1." To view the value associated with a data key of "1," snapshot tree 200 is traversed from root node 202 to intermediate node 212 to leaf node 222.

Leaf node 224 includes a data key-value pair of "2: DATA2." Leaf node 224 includes NodeID of "L2" and a TreeID of "1." To view the value associated with a data key of "2," snapshot tree 200 is traversed from root node 202 to intermediate node 212 to leaf node 224.

Leaf node 226 includes a data key-value pair of "3: DATA3." Leaf node 226 includes NodeID of "L3" and a TreeID of "1." To view the value associated with a data key of "3," snapshot tree 200 is traversed from root node 202 to intermediate node 212 to leaf node 226.

Leaf node 228 includes a data key-value pair of "4: DATA4." Leaf node 228 includes NodeID of "L4" and a TreeID of "1." To view the value associated with a data key of "4," snapshot tree 200 is traversed from root node 202 to intermediate node 214 to leaf node 228.

Leaf node 230 includes a data key-value pair of "5: DATA5." Leaf node 230 includes NodeID of "L5" and a TreeID of "1." To view the value associated with a data key of "5," snapshot tree 200 is traversed from root node 202 to intermediate node 214 to leaf node 230.

Figure 2B:
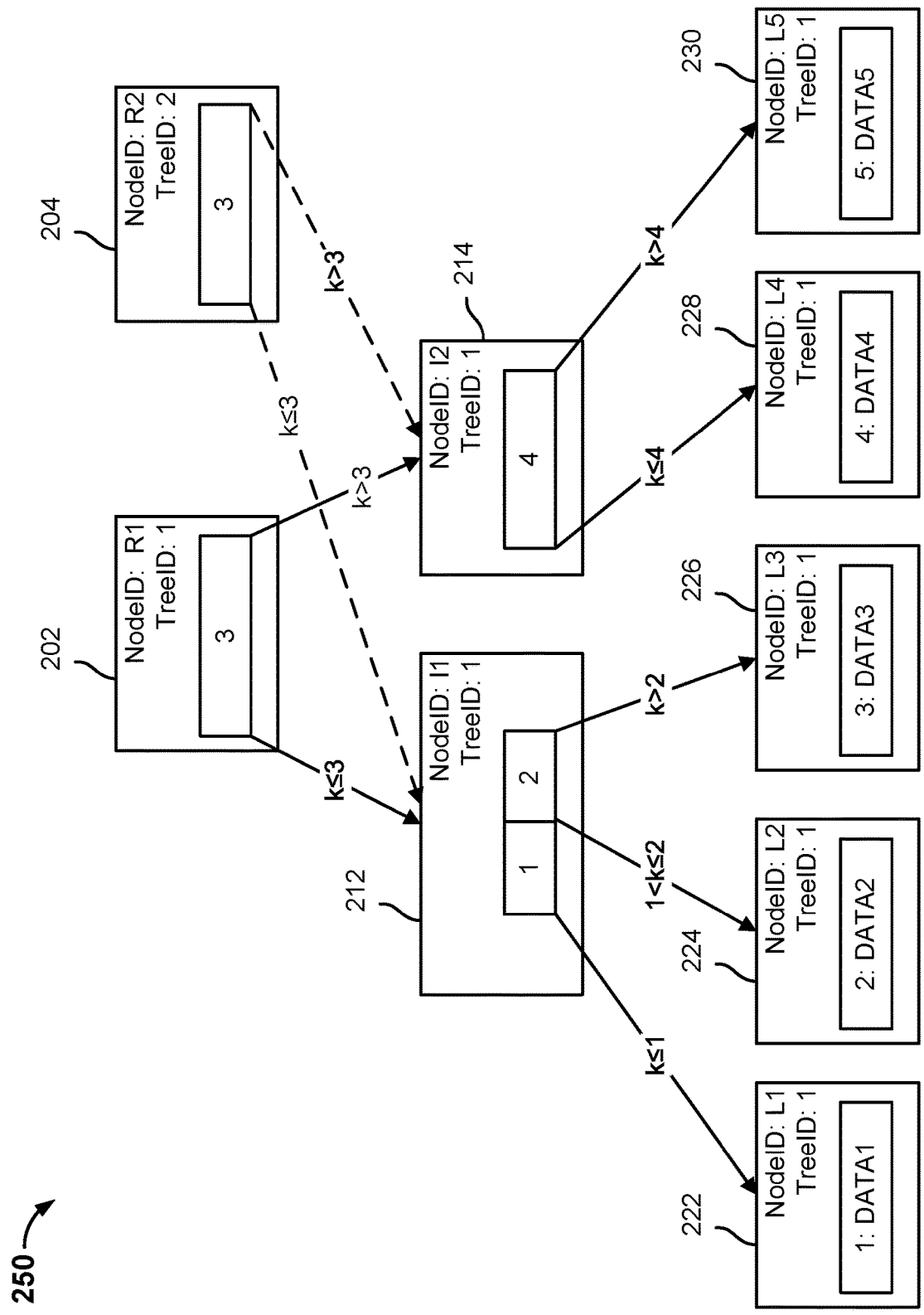
FIG. 2B is a block diagram illustrating an embodiment of adding a snapshot tree to a tree data structure.

FIG. 2B is a block diagram illustrating an embodiment of adding a snapshot tree to a tree data structure. In some embodiments, snapshot tree 250 may be created by a storage system, such as first storage site 112. In the example shown, snapshot tree 250 includes root node 204, intermediate nodes 212, 214, and leaf nodes 222, 224, 226, 228, and 230. Snapshot tree 250 may be a snapshot of file system data at a particular point in time t+n. The snapshot tree can be used to capture different versions of file system data at different moments in time. The snapshot tree may also efficiently locate desired metadata by traversing a particular snapshot version. In some embodiments, the tree data structure allows a chain of snapshot versions (i.e., snapshot trees) to be linked together by allowing a node of a later version of a snapshot tree to reference a node of a previous version of a snapshot tree. For example, snapshot tree 250 is linked to snapshot tree 200. A snapshot tree includes a root node, one or more levels of one or more intermediate nodes associated with the root node, and one or more leaf nodes associated with each intermediate node of the lowest intermediate level. For example, a root node or an intermediate node of a version of a snapshot tree may reference an intermediate node or a leaf node of a previous version of a snapshot tree. Each time a snapshot is performed, a new root node is created and the new root node includes the same set of pointers included in the previous root node, that is the new root node of the snapshot may be linked to one or more intermediate nodes associated with a previous snapshot. The new root node also includes a different NodeID and a different TreeID. The TreeID is the view identifier associated with a view of the snapshot tree at a particular moment in time. In some embodiments, root node 204 is associated with a current view of the file system metadata. A current view may still accept one or more changes to the data. The TreeID of a root node indicates a snapshot with which the root node is associated. For example, root node 202 with a TreeID of "1" is associated with a first snapshot and root node 204 with a TreeID of "2" is associated with a second snapshot. In other embodiments, root node 202 is associated with a snapshot view of the file system metadata. A snapshot view may represent a state of the file system data at a particular moment in time in the past and is not updated.

In some embodiments, to create a snapshot of the file system at time t+n, two new root nodes are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable). In some embodiments, a root node associated with a previous snapshot view is removed from the snapshot tree after a snapshot is performed (e.g., root node 202 is removed after root node 204 is added).

In the example shown, root node 204 is a copy of root node 202. Similar to root node 202, root node 204 includes the same pointers as root node 202. Root node 204 includes a first set of pointers to intermediate node 212. The first set of pointers associated with a data key k less than or equal to the node key (e.g., "1," "2," or "3") indicates that traversing snapshot tree 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing snapshot tree 250 from root node 204 to intermediate node intermediate node 214 will lead to a leaf node with a data key of "4" or "5." Root node 204 includes a NodeID of "R2" and a TreeID of "2." The NodeID identifies the name of the node. The TreeID identifies the snapshot with which the node is associated.

Figure 2C:
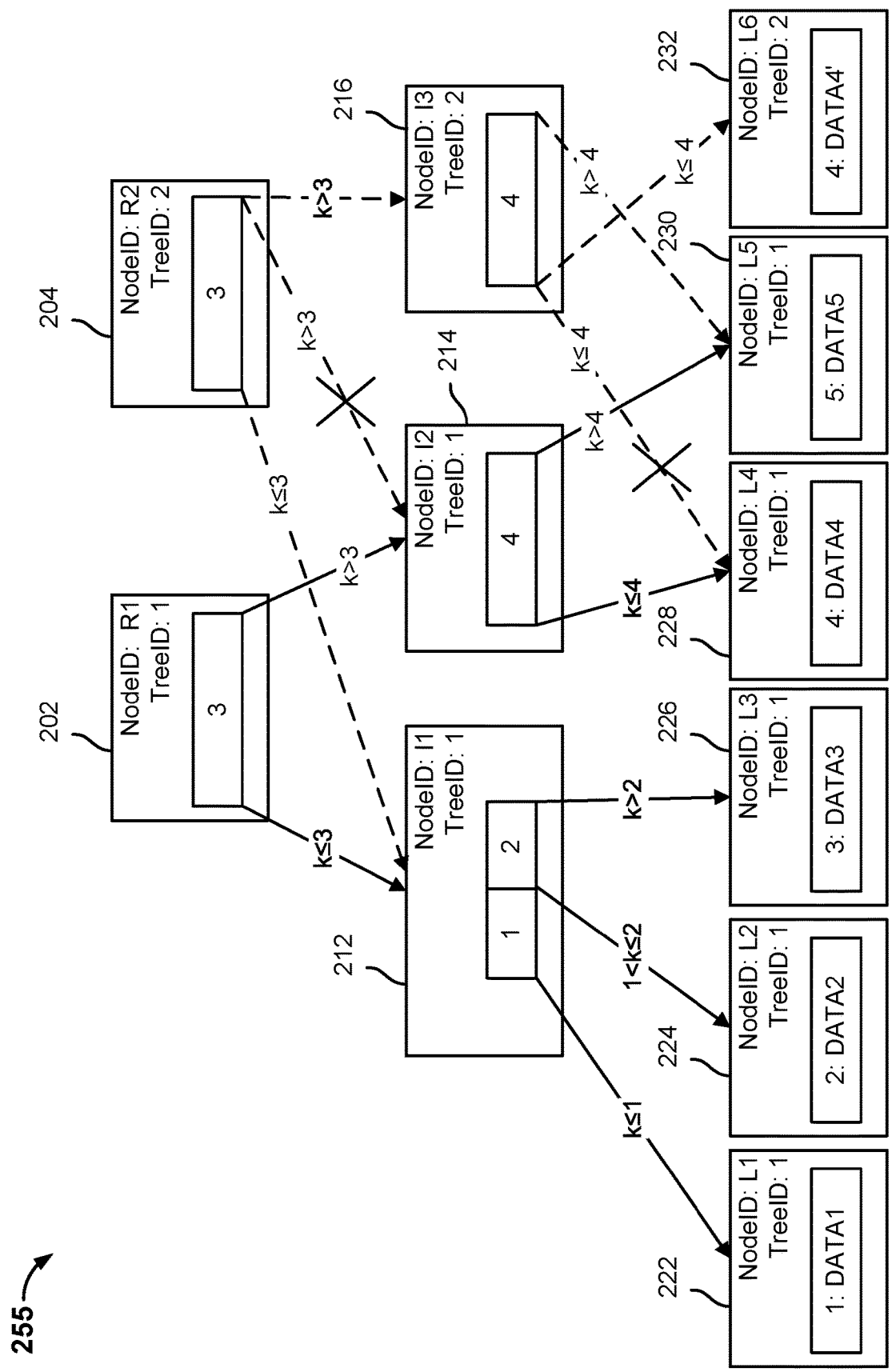
FIG. 2C is a block diagram illustrating an embodiment of modifying a snapshot tree.

FIG. 2C is a block diagram illustrating an embodiment of modifying a snapshot tree. In the example shown, snapshot tree 255 may be modified by a file system manager, such as file system manager 105. Snapshot tree 255 may be a current view of the file system data at time t+n+m, for example, at time $t_2$. A current view represents a state of the file system data that is up-to-date and capable of receiving one or more modifications to the snapshot tree that correspond to modifications to the file system data. Because a snapshot represents a perspective of the file system metadata that is "frozen" in time, one or more copies of one or more nodes affected by a change to file system data, are made.

In the example shown, the value "DATA4" has been modified to be "DATA4'." At $t_2$, the file system manager starts at root node 204 because that is the root node associated with snapshot tree at time $t_2$ (i.e., the root node associated with the last snapshot). The value "DATA4" is associated with the data key "4." The file system manager traverses snapshot tree 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses snapshot tree 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

Figure 2D:
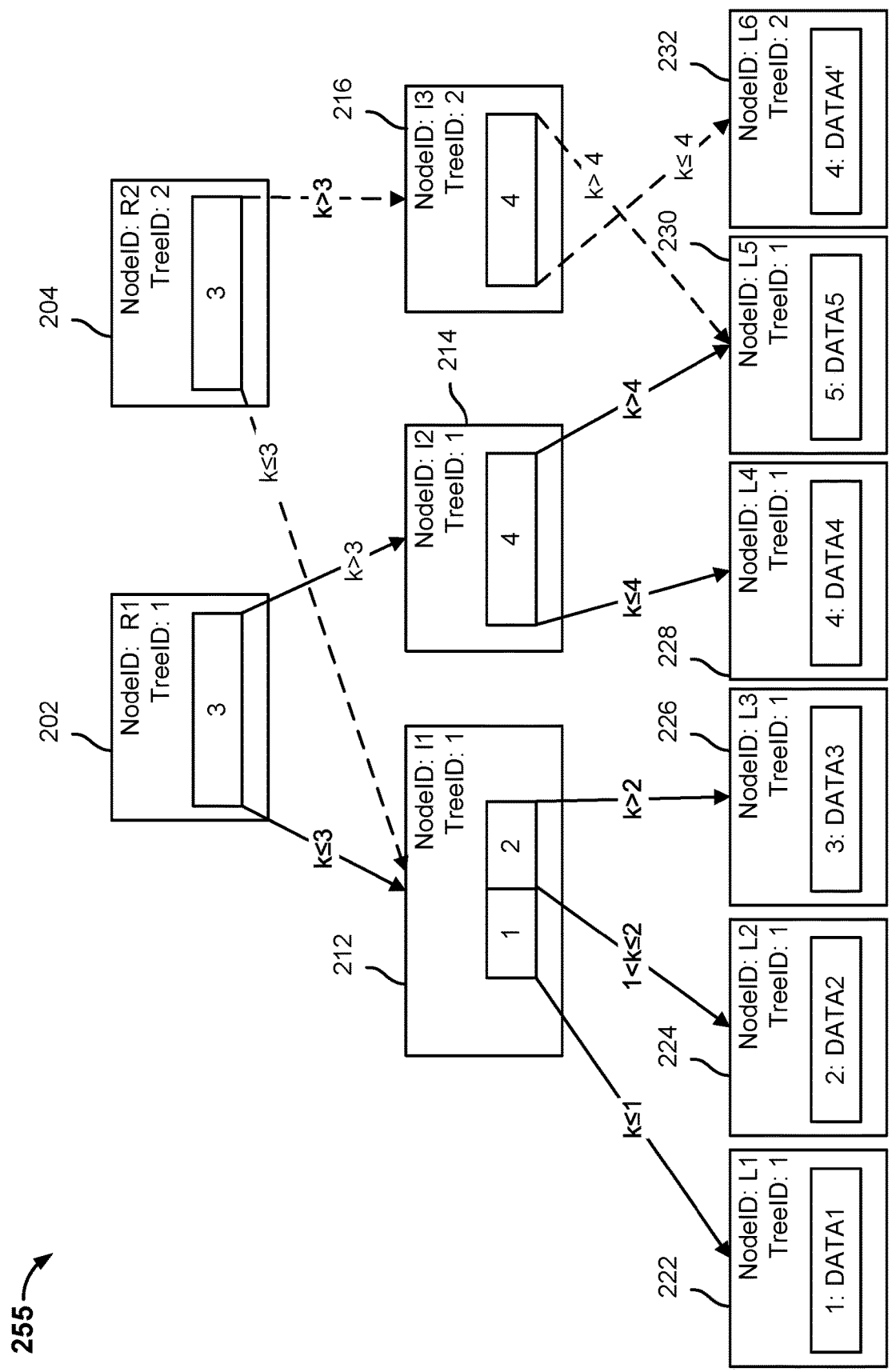
FIG. 2D is a block diagram illustrating an embodiment of a modified snapshot tree.

FIG. 2D is a block diagram illustrating an embodiment of a modified snapshot tree. Snapshot tree 255 shown in FIG. 2D illustrates a result of the modifications made to snapshot tree 255 as described with respect to FIG. 2C.

Figure 3A:
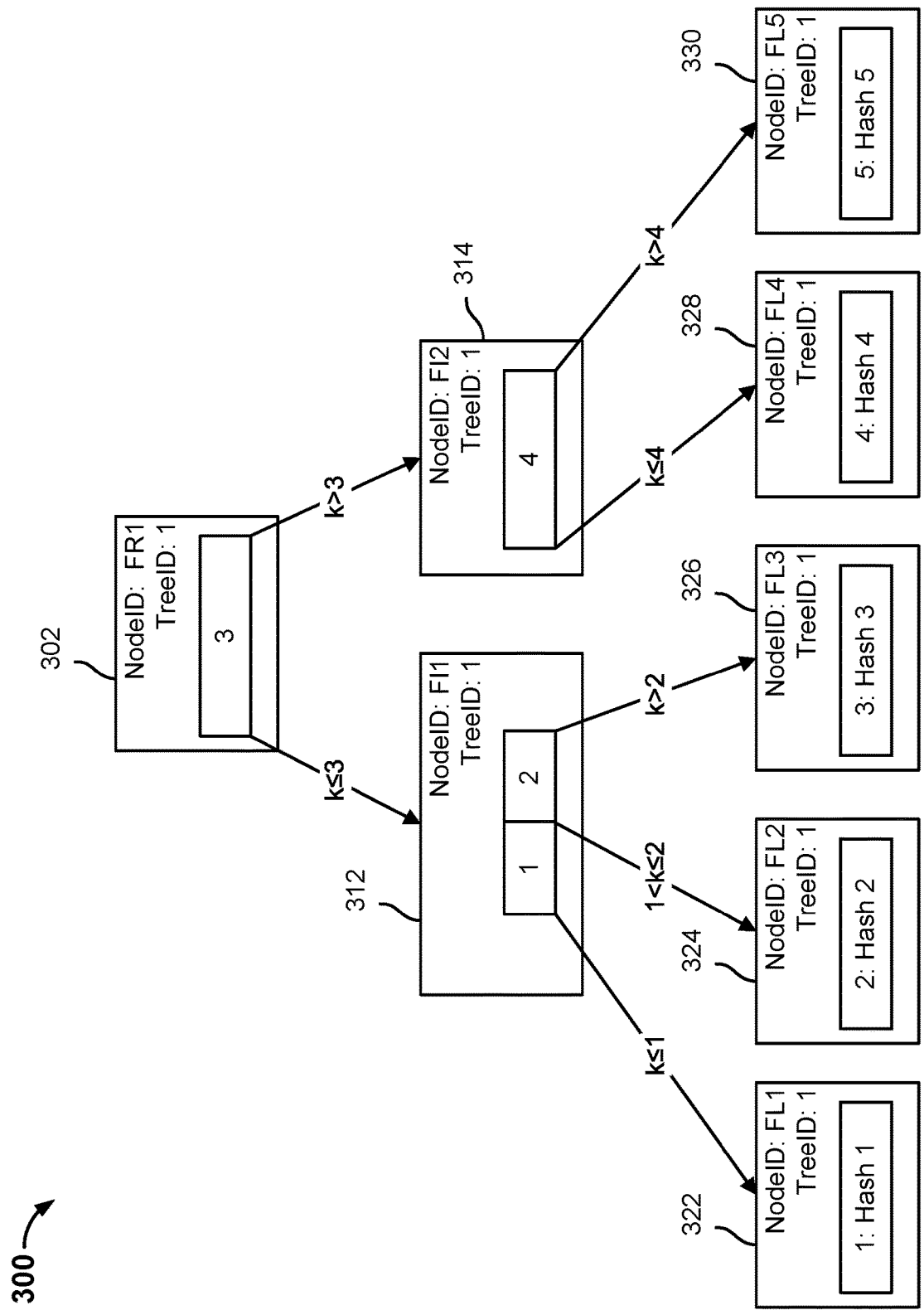
FIG. 3A is a block diagram illustrating an embodiment of a file tree.

FIG. 3A is a block diagram illustrating an embodiment of a file tree. In some embodiments, file tree 300 may be created by a storage system, such as first storage site 112. In the example shown, file tree 300 is a tree data structure that stores file system data. A leaf node of a snapshot tree, such as snapshot tree 255, may include a pointer to a file tree, such as file tree 300. A file tree is a snapshot tree, but stores file system data. A file tree may be comprised of a root node, one or more levels of one or more intermediate nodes, and one or more leaf nodes. In some embodiments, a file tree is comprised of a root node and one or more leaf nodes without any intermediate nodes. File tree 300 may be a snapshot of file system data at a particular point in time t, for example at time $t_0$.

In the example shown, file tree 300 includes a file root node 302, file intermediate nodes 312, 314, and file leaf nodes 322, 324, 326, 328, 330. Although file tree 300 includes one intermediate level between root node 302 and leaf nodes 322, 324, 326, 328, 330, any number of intermediate levels may be implemented. Similar of the snapshot trees described above, each node includes a "NodeID" that identifies the node and a "TreeID" that identifies a view with which the node is associated.

In the example shown, root node 302 includes a pointer to intermediate node 312 and a pointer to intermediate node 314. Root node 202 includes a NodeID of "FR1" and a TreeID of "1." The NodeID identifies the name of the node. The TreeID identifies the snapshot/view with which the node is associated.

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 212 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing file tree 300 from intermediate node 312 to leaf node 322 will lead to the node with a data key of "1." The pointer to leaf node 324 indicates that traversing file tree 300 from intermediate node 312 to leaf node 324 will lead to the node with a data key of "2." The pointer to leaf node 326 indicates that traversing file tree 300 from intermediate node 312 to leaf node 326 will lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing file tree 300 from intermediate node 314 to leaf node 328 will lead to the node with a data key of "4." The pointer to leaf node 330 indicates that traversing file tree 300 from intermediate node 314 to leaf node 330 will lead the node with a data key of "5."

Leaf node 322 includes a data key-value pair of "1: Hash 1." "Hash 1" is a chunk identifier that uniquely identifies the data chunk with which the "Hash 1" is associated. Leaf node 322 includes NodeID of "FL1" and a TreeID of "1." To view the value associated with a data key of "1," file tree 300 is traversed from root node 302 to intermediate node 312 to leaf node 322.

Leaf node 324 includes a data key-value pair of "2: Hash 2." "Hash 2" is a chunk identifier that uniquely identifies the data chunk with which the "Hash 2" is associated. Leaf node 324 includes NodeID of "FL2" and a TreeID of "1." To view the value associated with a data key of "2," file tree 300 is traversed from root node 302 to intermediate node 312 to leaf node 324.

Leaf node 326 includes a data key-value pair of "3: Hash 3." "Hash 3" is a chunk identifier that uniquely identifies the data chunk with which the "Hash 3" is associated. Leaf node 326 includes NodeID of "FL3" and a TreeID of "1." To view the value associated with a data key of "3," file tree 300 is traversed from root node 302 to intermediate node 312 to leaf node 326.

Leaf node 328 includes a data key-value pair of "4: Hash 4." "Hash 4" is a chunk identifier that uniquely identifies the data chunk with which the "Hash 4" is associated. Leaf node 328 includes NodeID of "FL4" and a TreeID of "1." To view the value associated with a data key of "4," file tree 300 is traversed from root node 302 to intermediate node 314 to leaf node 328.

Leaf node 330 includes a data key-value pair of "5: Hash 5." "Hash 5" is a chunk identifier that uniquely identifies the data chunk with which the "Hash 5" is associated. Leaf node 330 includes NodeID of "FL5" and a TreeID of "1." To view the value associated with a data key of "5," file tree 300 is traversed from root node 302 to intermediate node 314 to leaf node 330.

A file may be comprised of a plurality of chunks. In some embodiments, a leaf node stores a chunk of data. In other embodiments, a leaf node stores a chunk identifier. In the example shown, leaf nodes 322, 324, 326, 328, 330 each store a corresponding chunk identifier. A metadata store includes a data structure that matches a chunk identifier with a corresponding location (physical location) of the data chunk. In some embodiments, a snapshot tree may have a leaf node that stores a corresponding chunk identifier for one of the chunks of a file tree. For example, a snapshot tree that points to file tree 300 may have a leaf node that stores a chunk identifier for "Chunk 1," a leaf node that stores a chunk identifier for "Chunk 2," a leaf node that stores a chunk identifier for "Chunk 3," a leaf node that stores a chunk identifier for "Chunk 4," and/or a leaf node that stores a chunk identifier for "Chunk 5."

Figure 3B:
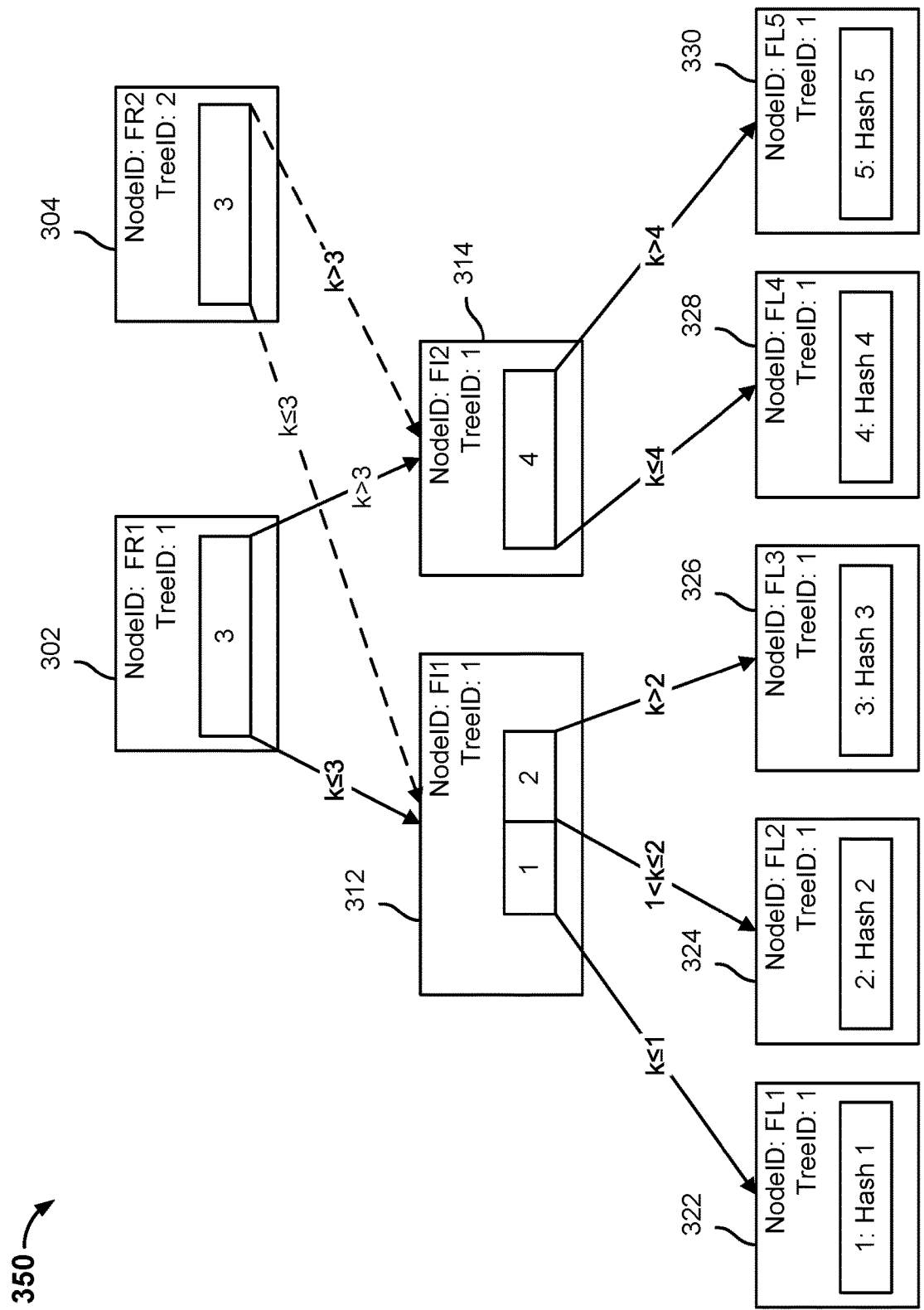
FIG. 3B is a block diagram illustrating an embodiment of adding a file tree to a file tree data structure.

FIG. 3B is a block diagram illustrating an embodiment of adding a file tree to a file tree data structure. In some embodiments, file tree 350 may be created by a storage system, such as first storage site 112. A file tree is a snapshot tree, but stores file system data. The file tree can be used to capture different versions of file system data at different moments in time. In some embodiments, the file tree structure allows a chain of file tree versions to be linked together by allowing a node of a later version of a file tree to reference a node of a previous version of a file tree. For example, a root node or an intermediate node of a version of a file tree may reference an intermediate node or a leaf node of a previous version of a file tree. Similar to the snapshot tree structure, the file tree structure allows different versions of file system data to share nodes and allows changes to file system data to be tracked. Each time a snapshot is performed, a root node of the file tree may be linked to one or more intermediate nodes associated with a previous file tree. In the example shown, file tree 350 includes root node 302, intermediate nodes 312, 314, and leaf nodes 322, 324, 326, 328, and 330. File tree 350 may be a snapshot of file system data at a particular point in time t+n, for example at time $t_1$. To create a snapshot of the file system data at time t+n, a new root node is created. The new root node includes the same set of pointers as the original node. In the example shown, root node 304 includes a set of pointers to intermediate nodes 312, 314, which are intermediate nodes associated with a previous snapshot. The new root node also includes a different NodeID and a different TreeID. The TreeID is the view identifier associated with a view of the file tree at a particular moment in time. In some embodiments, root node 304 is associated with a current view of the file system data. The current view may represent a state of the file system data that is up-to-date and is capable of receiving one or more modifications to the file tree that correspond to modifications to the file system data. The TreeID of a root node indicates a snapshot with which the root node is associated. For example, root node 302 with a TreeID of "1" is associated with a first snapshot and root node 304 with a TreeID of "2" is associated with a second snapshot. In other embodiments, root node 304 is associated with a snapshot view of the file system data. A snapshot view may represent a state of the file system data at a particular moment in time in the past and is not updated.

In some embodiments, to create a snapshot of the file system data at time t+n, two new root nodes are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable).

In the example shown, root node 304 is a copy of root node 302. Similar to root node 302, root node 304 includes the same pointers as root node 302. Root node 304 includes a first set of pointers to intermediate node 312. The first set of pointers associated with a data key (e.g., "1," "2," or "3") less than or equal the node key indicates that traversing file tree 350 from root node 304 to intermediate node 312 will lead to a leaf node with a data key of "1," "2," or "3." Root node 304 includes a second set of pointers to intermediate node 314. The second set of pointers associated with a data key greater than the node key indicates that traversing file tree 350 from root node 304 to intermediate node 314 will lead to a leaf node with a data key of "4" or "5." Root node 304 includes a NodeID of "FR2" and a TreeID of "2." The NodeID identifies the name of the node. The TreeID identifies the snapshot with which the node is associated.

Figure 3C:
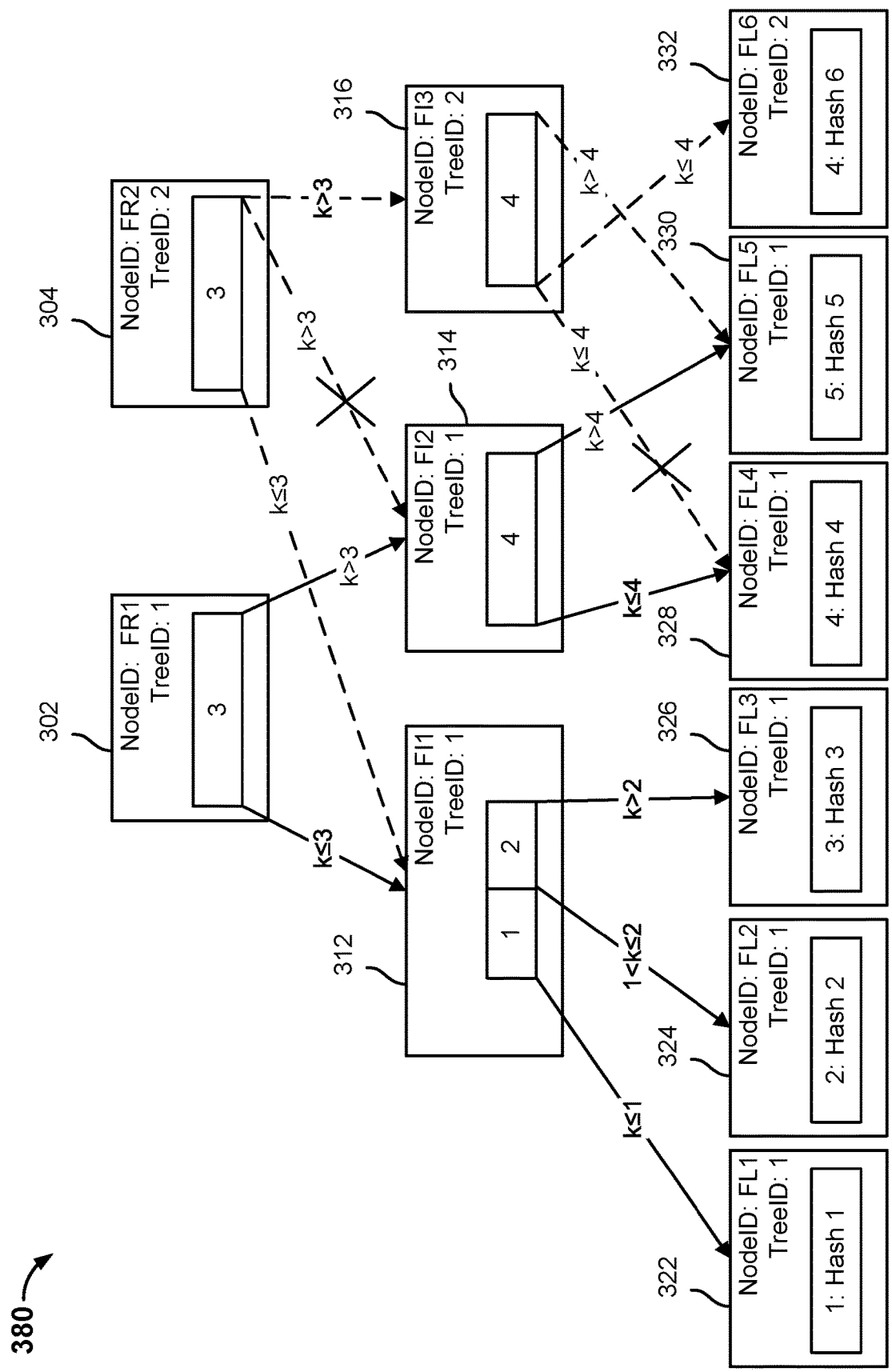
FIG. 3C is a block diagram illustrating an embodiment of modifying a file tree.

FIG. 3C is a block diagram illustrating an embodiment of modifying a file tree. In the example shown, file tree 380 may be modified by a file system manager, such as file system manager 105. File tree 380 may be a current view of the file system data at time t+n+m, for example, at time $t_2$. A current view may represent a state of the file system data that is up-to-date and capable of receiving one or more modifications to the snapshot tree that correspond to modifications to the file system data. Because a snapshot represents a perspective of the file system data that is "frozen" in time, one or more copies of one or more nodes affected by a change to file system data, are made.

In some embodiments, the file system data may be modified such that one of the data chunks is replaced by another data chunk. When a data chunk of file system data associated with a previous snapshot is replaced with a new data chunk, the chunk identifier associated with the data chunk of a previous snapshot may no longer apply to the file system data. A leaf node of a file tree stores a chunk identifier associated with a particular data chunk. To represent this modification to the file system data, a corresponding modification is made to a current view of a snapshot in the file tree. The current view of the file tree is modified because the previous snapshot is a snapshot view and can no longer be modified. The data chunk of the file system data that was replaced has a corresponding leaf node in the previous snapshot. A new leaf node in the current view of the snapshot is created, as described herein, that corresponds to the new data chunk. The new leaf node includes an identifier associated with the current view. The new leaf node may also store the chunk identifier associated with the modified data chunk.

In the example shown, "Hash 4" has been modified to be "Hash 6" because the data chunk that has a chunk identifier of "Hash 4" has been replaced with a data chunk that has a chunk identifier of "Hash 6." At $t_2$, the file system manager starts at root node 304 because that is the root node associated with the file tree at time $t_2$. The value "Hash 4" is associated with the data key "4." The file system manager traverses file tree 380 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses file tree 380 from intermediate node 316 to leaf node 328, determines that the TreeID of leaf node 328 does not match the TreeID of root node 304, and creates a copy of leaf node 328. Leaf node 332 is a copy of leaf node 328, but stores the data chunk identifier "Hash 6" and includes the same TreeID as root node 304. The file system manager updates a pointer of intermediate node 316 to point to leaf node 332 instead of pointing to leaf node 328.

Figure 3D:
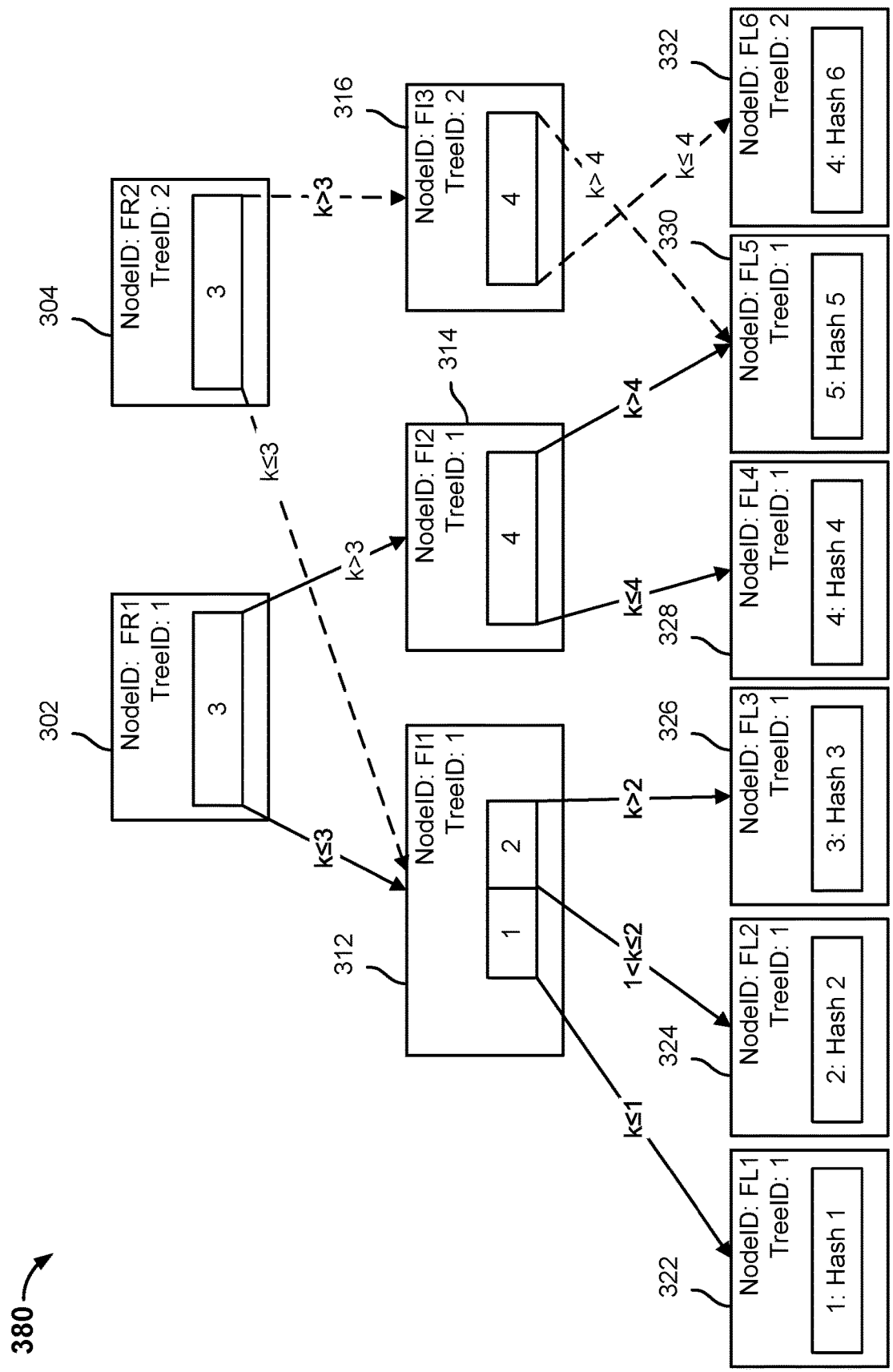
FIG. 3D is a block diagram illustrating an embodiment of a modified file tree.

FIG. 3D is a block diagram illustrating an embodiment of a modified file tree. The file tree 380 shown in FIG. 3D illustrates a result of the modifications made to file tree 380 as described with respect to FIG. 3C.

Figure 3E:
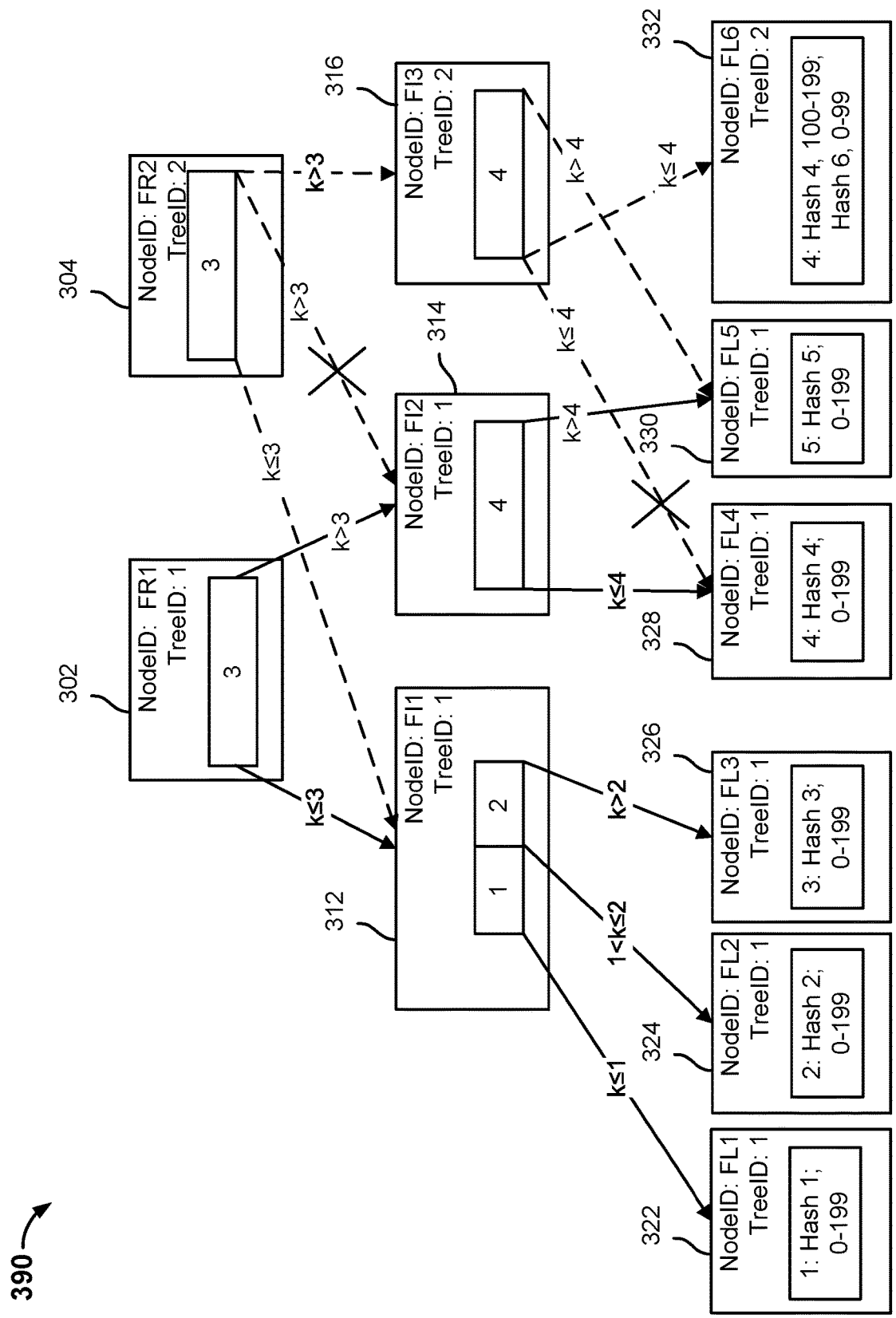
FIG. 3E is a block diagram illustrating an embodiment of modifying a file tree.

FIG. 3E is a block diagram illustrating an embodiment of modifying a file tree. In the example shown, file tree 390 may be modified by a file system manager, such as file system manager 105. File tree 390 may be a current view of the file system data at time t+n+m, for example, at time $t_2$. A current view may represent a state of the file system data that is up-to-date and capable of receiving one or more modifications to the snapshot tree that correspond to modifications to the file system data. Because a snapshot represents a perspective of the file system data that is "frozen" in time, one or more copies of one or more nodes affected by a change to file system data, are made.

File tree 390 is similar to file tree 380, except that leaf nodes 322, 324, 326, 328, 330, 332 have a corresponding chunk offset that indicates a portion of a data chunk with which a chunk identifier applies. A chunk identifier may apply to the entire portion of a data chunk or a specific portion (e.g., front, middle, end) portion. The chunk identifier may have a corresponding chunk offset that indicates the bytes of a data chunk with which the chunk identifier applies. For example, leaf node 322 includes a chunk identifier "Hash 1" that applies to bytes 0-199 of "Chunk 1." The offset length indicates a byte length with which the chunk identifier applies. For example, leaf node 322 includes a chunk identifier "Hash 1" with an offset length of 100 bytes.

In some embodiments, a write to the file system data may occur such that a portion of a data chunk is overwritten with a new data chunk. As a result, the chunk identifier associated with the data chunk applies to a portion of the modified file system data and the chunk identifier associated with the new data chunk applies to the portion of the file system data that previously corresponded to the overwritten portion of the data chunk. To represent this modification to the file system data, a corresponding modification is made to a current view of a snapshot in the file tree. The current view of the snapshot is modified because the previous snapshot is a snapshot view and can no longer be modified. The data chunk of the file system has a corresponding leaf node in the previous snapshot. A new leaf node is added to the current view of the snapshot, as described herein, which corresponds to the modified file system data. The new leaf node includes an identifier associated with the current view of the snapshot. The new leaf node also stores metadata that describes the modification. The new leaf node may include the chunk identifier associated with the data chunk, a corresponding chunk offset that describes a portion of the data chunk with which the chunk identifier still applies, a chunk identifier associated with the new data chunk, and/or a corresponding chunk offset that describes the portion of the new data chunk with which the chunk identifier applies. In some embodiments, the metadata may also include a file offset for each chunk identifier that identifies a portion of the file system data with which the chunk identifier applies and/or an offset length that identifies a length of the chunk identifier.

In the example shown, the data chunk associated with the chunk identifier of "Hash 4" has been partially overwritten with a data chunk associated with a chunk identifier of "Hash 6." To represent this modification to the file system data, a corresponding modification is made to a current view of a snapshot in the snapshot tree. At $t_2$, the file system manager starts at root node 304 because that is the root node associated with snapshot tree at time $t_2$. The value "Hash 4" is associated with the data key "4." The file system manager traverses file tree 390 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses snapshot tree 390 from intermediate node 316 to leaf node 328, determines that the TreeID of leaf node 328 does not match the TreeID of root node 304, and creates a copy of leaf node 328. Leaf node 332 is a copy of leaf node 328, but includes the same TreeID as root node 304. The value of leaf node 332 includes the chunk identifier "Hash 4" associated with a data chunk, a corresponding chunk offset (e.g., 100-199) that describes a portion of the data chunk with which the chunk identifier of "Hash 4" still applies, a chunk identifier "Hash 6" associated with the new data chunk, and a corresponding chunk offset (e.g., 0-99) that describes the portion of the new data chunk with which the chunk identifier of "Hash 6" applies. In some embodiments, the metadata may also include a file offset for each chunk identifier that identifies a portion of the file system data with which the chunk identifier applies and an offset length. The file system manager is configured to update a pointer of intermediate node 316 to point to leaf node 332 instead of pointing to leaf node 328.

Figure 3F:
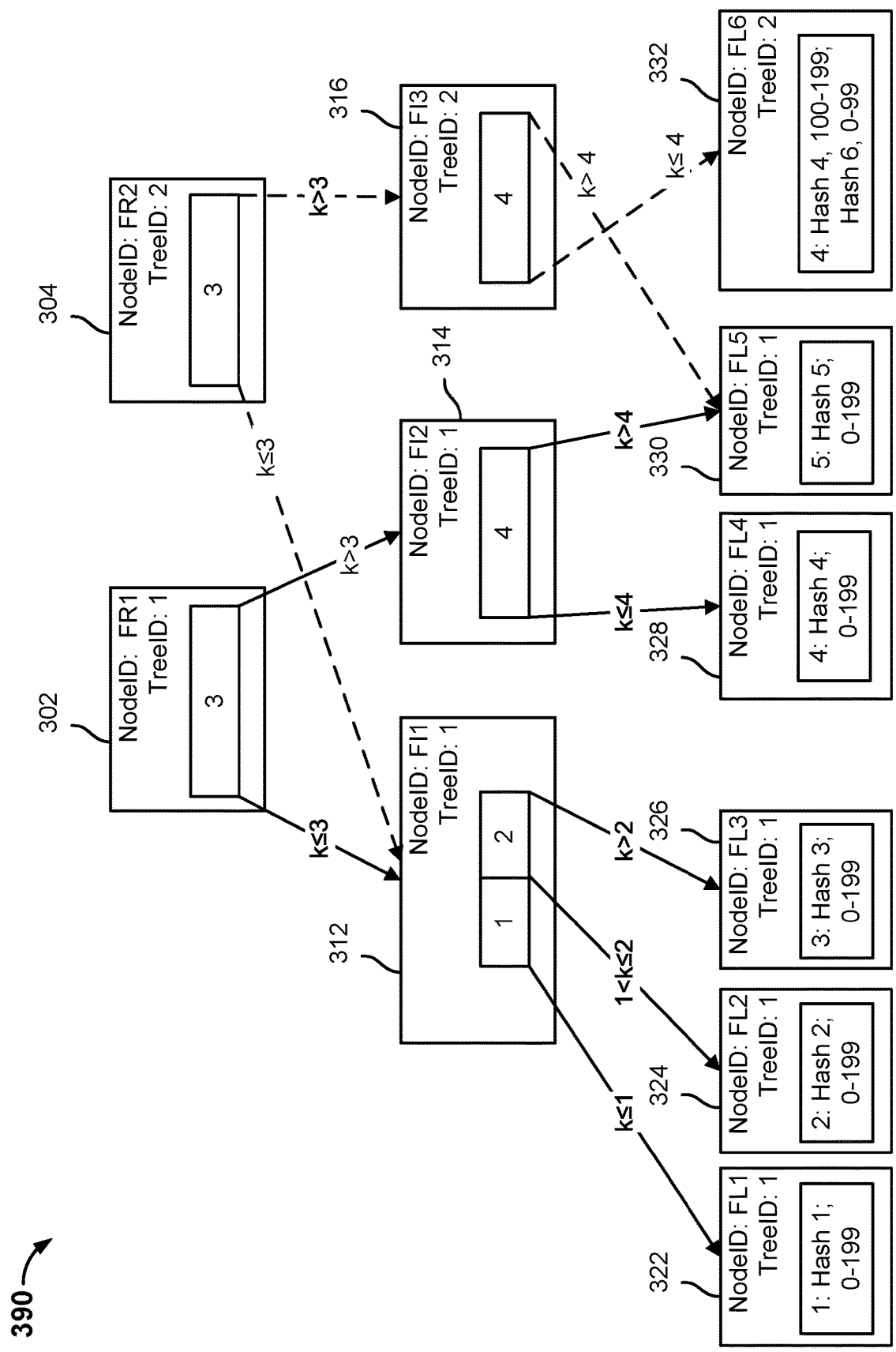
FIG. 3F is a block diagram illustrating an embodiment of a modified file tree.

FIG. 3F is a block diagram illustrating an embodiment of a modified file tree. The file tree 390 shown in FIG. 3F illustrates a result of the modifications made to file tree 390 as described with respect to FIG. 3E.

Figure 4A:
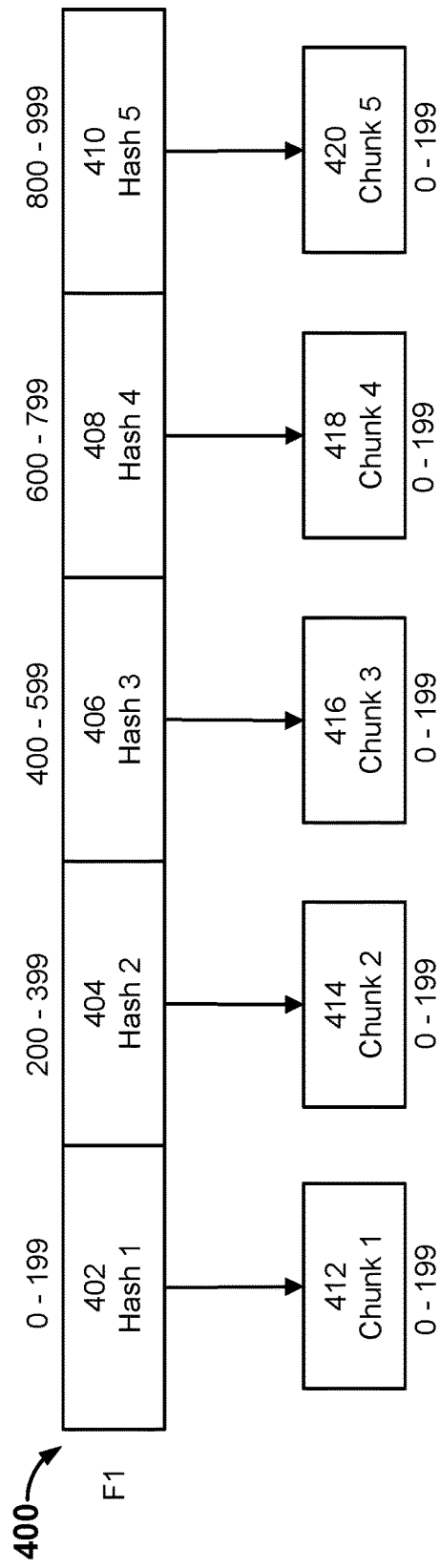
FIG. 4A is a block diagram illustrating an embodiment of file system data.

FIG. 4A is a block diagram illustrating an embodiment of file system data. A file is segmented into a plurality of data bricks. File system data is chunked into one or more data chunks and each data chunk is associated with a corresponding chunk identifier. The chunk identifier is a value that uniquely identifies the data chunk with which the chunk identifier is associated.

In the example shown, file system data 400 is comprised of a plurality of bricks: brick 402, 404, 406, 408, 410. Each brick includes a corresponding chunk identifier. For example, brick 402 includes "Hash 1," brick 404 includes "Hash 2," brick 406 includes "Hash 3," brick 408 includes "Hash 4," and brick 410 includes "Hash 5." In other embodiments, a data brick may include a plurality of chunk identifiers.

Chunk identifiers "Hash 1," "Hash 2" "Hash 3," "Hash 4," and "Hash 5" are associated with a corresponding data chunk. For example, the chunk identifier of "Hash 1" is associated with data chunk 412 "Chunk 1," the chunk identifier of "Hash 2" is associated with data chunk 414 "Chunk 2," the chunk identifier of "Hash 3" is associated with data chunk 416 "Chunk 3," the chunk identifier of "Hash 4" is associated with data chunk 418 "Chunk 4," and the chunk identifier of "Hash 5" is associated with data chunk 420 "Chunk 5." The chunk identifier is a value (numerical, non-numerical, or combination thereof, cryptographic hash, SHA-1, etc.) that uniquely identifies the contents (i.e., one or more data blocks) included in the chunk.

Figure 4B:
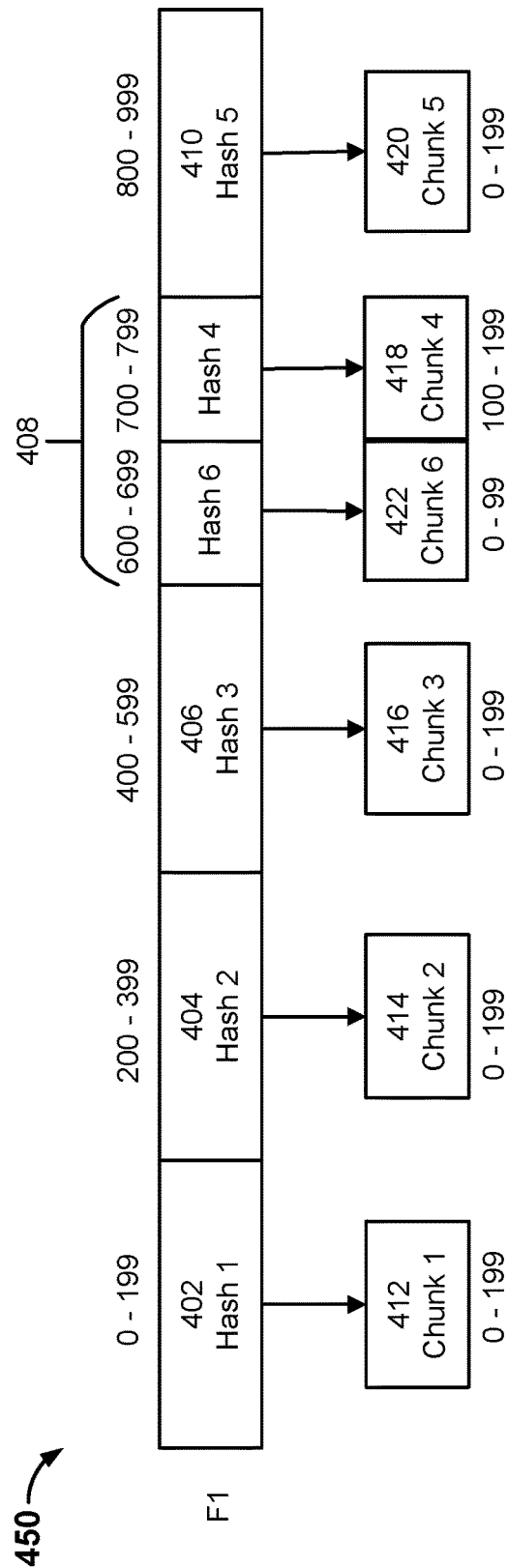
FIG. 4B is a block diagram illustrating an embodiment of file system data.

Each brick has an associated file offset range that identifies a portion of a file with which the brick is associated. For example, brick 402 is associated with a file offset range of 0-199, brick 404 is associated with a file offset range of 200-399, brick 406 is associated with a file offset range of 400-599, brick 408 is associated with a file offset range of 600-799, and brick 410 is associated with a file offset range of 800-999. Although the example depicts each brick being associated with a 200 byte block of data, a brick may have other sizes (e.g., $2^n$ bytes). For a given file system, the brick size may be any size, but each brick has a fixed size. That is, each brick for the given file system is the same size. In the example shown, each chunk identifier applies to the entire file offset range for a corresponding data brick, but may apply to, as depicted in FIG. 4B, a portion of the file offset range for a corresponding data brick. A data brick may be comprised of one or more chunk identifiers.

Each chunk identifier may have an associated file offset range that identifies a portion of the file system data with which the chunk identifier applies. For example, the chunk identifier of "Hash 1" applies to bytes 0-199 of F1, the chunk identifier of "Hash 2" applies to bytes 200-399 of F1, the chunk identifier of "Hash 3" applies to bytes 400-599 of F1, the chunk identifier of "Hash 4" applies to bytes 600-799 of F1, and the chunk identifier of "Hash 5" applies to bytes 800-999 of F1.

Each chunk identifier may have an associated chunk offset range that identifies a portion of the associated data chunk with which the chunk identifier applies. The chunk identifier may apply to a portion of or an entire data chunk. In the example shown, each chunk identifier applies to an entire data chunk. For example, the chunk identifier of "Hash 1" applies to bytes 0-199 of Chunk 1, the chunk identifier of "Hash 2" applies to bytes 0-199 of Chunk 2, the chunk identifier of "Hash 3" applies to bytes 0-199 of Chunk 3, the chunk identifier of "Hash 4" applies to bytes 0-199 of Chunk 4, and the chunk identifier of "Hash 5" applies to bytes 0-199 of Chunk 5.

Although the example depicts each chunk identifier being associated with a 200 byte block of data, a chunk identifier may be associated with other sizes (e.g., between 8 k and 40 k, in multiples of 1 k, depending on fingerprinting algorithm). Also, the data chunks may be greater than 200 bytes, equal to 200 bytes, or less than 200 bytes.

FIG. 4B is a block diagram illustrating an embodiment of file system data. A file is segmented into a plurality of data bricks. In the example shown, file system data 450 is comprised of a plurality of bricks: brick 402, 404, 406, 408, and 410. File system data 450 is similar to file system data 400 except that brick 408 includes chunk identifiers "Hash 4" and "Hash 6." FIG. 4B is an example of a write to the file system data such that a portion of a data chunk is overwritten with a new data chunk.

Similar to file system data 400, each chunk identifier of file system data 450 is associated with a corresponding data chunk. For example, the chunk identifier of "Hash 1" is associated with data chunk 412 "Chunk 1," the chunk identifier of "Hash 2" is associated with data chunk 414 "Chunk 2," the chunk identifier of "Hash 3" is associated with data chunk 416 "Chunk 3," the chunk identifier of "Hash 4" is associated with data chunk 418 "Chunk 4," the chunk identifier of "Hash 5" is associated with data chunk 420 "Chunk 5," and the chunk identifier of "Hash 6" is associated with data chunk 422 "Chunk 6." The chunk identifier is a value (numerical, non-numerical, or combination thereof, cryptographic hash, SHA-1, etc.) that uniquely identifies the contents (i.e., one or more data blocks) included in the chunk.

Each brick has an associated file offset range that identifies a portion of a file with which the brick is associated. For example, brick 402 is associated with a file offset range of 0-199, brick 404 is associated with a file offset range of 200-399, brick 406 is associated with a file offset range of 400-599, brick 408 is associated with a file offset range of 600-799, and brick 410 is associated with a file offset range of 800-999. Although the example depicts each brick being associated with a 200 byte block of data, a brick may have other sizes (e.g., $2^n$ bytes). In the example shown, each chunk identifier may apply to a portion of or to the entire file offset range for a corresponding data brick.

Each chunk identifier may have an associated file offset range that identifies a portion of the file system data with which the chunk identifier applies. For example, the chunk identifier of "Hash 1" applies to bytes 0-199 of F1, the chunk identifier of "Hash 2" applies to bytes 200-399 of F1, the chunk identifier of "Hash 3" applies to bytes 400-599 of F1, the chunk identifier of "Hash 4" applies to bytes 700-799 of F1, the chunk identifier of "Hash 5" applies to bytes 800-999 of F1, and the chunk identifier of "Hash 6" applies to bytes 600-699 of F1.

Each chunk identifier may have an associated chunk offset range that identifies a portion of the associated data chunk with which the chunk identifier applies. The chunk identifier may apply to a portion of or an entire data chunk. For example, the chunk identifier of "Hash 1" applies to bytes 0-199 of Chunk 1, the chunk identifier of "Hash 2" applies to bytes 0-199 of Chunk 2, the chunk identifier of "Hash 3" applies to bytes 0-199 of Chunk 3, the chunk identifier of "Hash 4" applies to bytes 100-199 of Chunk 4, the chunk identifier of "Hash 5" applies to bytes 0-199 of Chunk 5, and the chunk identifier of "Hash 6" applies to bytes 0-99 of Chunk 6.

Although the example depicts each chunk identifier being associated with a 200 byte block of data, a chunk identifier may be associated with other sizes (e.g., between 8 k and 40 k, in multiples of 1 k, depending on fingerprinting algorithm). Also, the data chunks may be greater than 200 bytes, equal to 200 bytes, or less than 200 bytes.

Figure 5A:
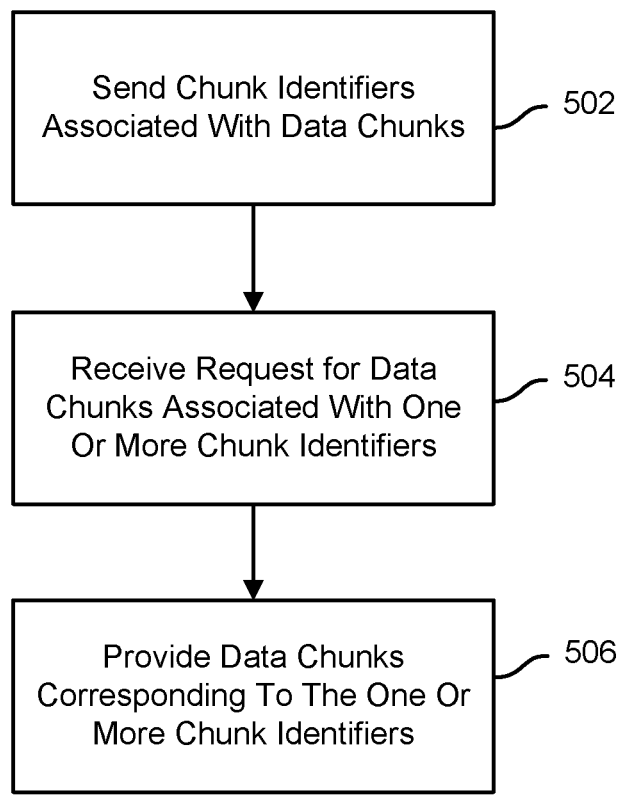
FIG. 5A is a flow chart illustrating an embodiment of a process for replicating data.

FIG. 5A is a flow chart illustrating an embodiment of a process for replicating data. In the example shown, process 500 may be implemented by a storage system, such as first storage site 112.

At 502, chunk identifiers associated with a snapshot are sent to a storage site. The chunk identifiers may include a chunk identifier associated with each leaf node of a snapshot tree view, regardless of when the chunk with which the chunk identifier is associated, was added to a tree structure. For example, file tree 380 represents a file at time $t_2$. Root node 304 is associated with a view of the file tree at time $t_2$. Root node 304 is associated with leaf nodes 322, 324, 326, 330, 332. Leaf nodes 322, 324, 326, 330 are associated with a previous snapshot because they have an identifier associated with the previous snapshot. Leaf node 332 is associated with a different snapshot because it has an identifier associated with the different snapshot. The chunk identifiers associated with leaf nodes 322, 324, 326, 330, 332 may be sent to the storage site.

In some embodiments, a remote procedure call to the storage site is invoked. The remote procedure call may include the chunk identifiers associated with the snapshot. For example, the remote procedure call may include the chunk identifiers associated with leaf nodes 322, 324, 326, 330, 332.

At 504, a request for data chunks associated with chunk identifiers not stored at the storage site is received. The storage site may compare the sent chunk identifiers to a list of chunk identifiers corresponding to previously replicated data chunks. For example, at time $t_2$, a request may include a request for the data chunk associated with the chunk identifier "Hash 6" because that data chunk was not previously replicated at time $t_0$. In some embodiments, the one or more previously replicated data chunks are linked to the same snapshot tree as the current snapshot. In some embodiments, the one or more previously replicated data chunks are unrelated to the current snapshot (e.g., data chunks replicated by a different storage site or associated with a different snapshot tree).

In some embodiments, a result of the remote procedure call returns the data chunks that need to be sent to the storage site. For example, the result of the remote procedure call may indicate that the data chunk associated with the chunk identifier "Hash 6" is to be sent to the storage site.

At 506, the one or more requested data chunks corresponding to the chunk identifiers not previously stored by the storage site are provided.

Figure 5B:
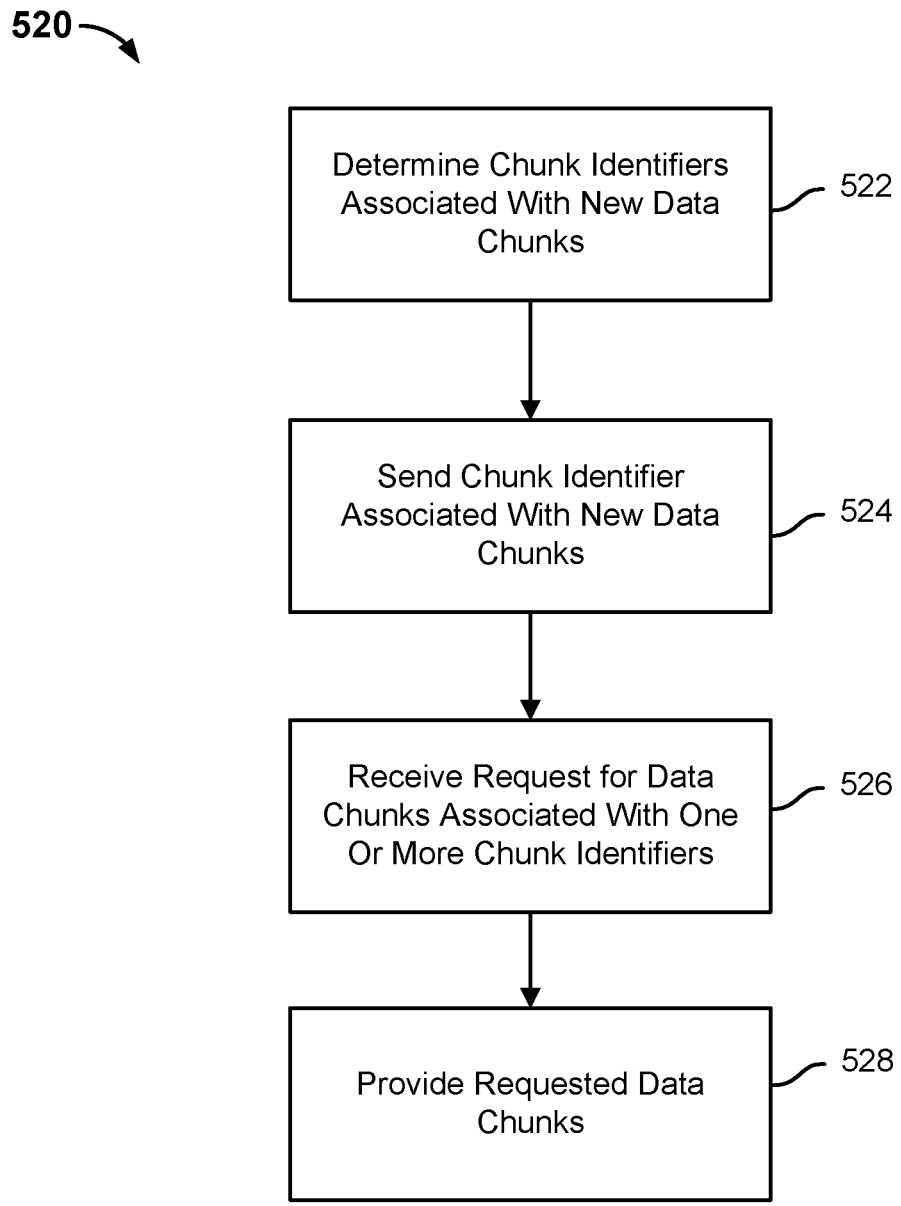
FIG. 5B is a flow chart illustrating an embodiment of a process for replicating data.

FIG. 5B is a flow chart illustrating an embodiment of a process for replicating data. In the example shown, process 520 may be implemented by a storage system, such as first storage site 112.

At 522, one or more chunk identifiers associated with new data chunks are determined. The file system data may be comprised of one or more data chunks, each data chunk comprised of a plurality of data blocks, each data chunk having a chunk identifier that uniquely identifies the data blocks of the data chunk. The file system data may be organized using a tree data structure, as described above. The snapshot tree data structure allows a chain of snapshot trees to be linked together. The snapshot data tree structure allows different versions of data to share nodes and allows changes to file system data to be tracked. A snapshot tree may reference one or more nodes associated with a previous snapshot tree. A snapshot tree includes a root node, one or more levels of one or more intermediate nodes, and one or more leaf nodes associated with each intermediate node of the lowest intermediate level. The root node includes an identifier that identifies the snapshot tree view with which the root node is associated. A leaf node may store file system metadata, a data chunk, or a pointer to a file tree. A file tree is a snapshot tree, but stores file system data. The file system metadata may include a chunk identifier associated with a data chunk. The chunk identifier is a value that uniquely identifies the data chunk with which the chunk identifier is associated. A leaf node also includes an identifier that identifies the snapshot tree view with which the leaf node is associated.

In some embodiments, an initial version of file system data is saved to the storage system. An initial snapshot of the snapshot tree may be created that represents the initial version of the file system data. Since the initial snapshot is the only snapshot of the snapshot tree, the chunk identifiers stored in the leaf nodes of the snapshot tree are determined to be associated with new data chunks.

In other embodiments, a subsequent version of file system data is saved to the storage system. A subsequent snapshot that represents the subsequent version of the file system data may be added to the snapshot tree structure. The subsequent version of file system data may overlap with one or more portions of the previous versions of the file system data. The snapshot tree data structure may reflect such an overlap. For example, a node associated with a subsequent snapshot may reference one or more nodes associated with one or more previous snapshots. As seen in FIG. 3D, root node 304 of file tree 380 includes a pointer to intermediate node 312 and a pointer to intermediate node 316. Intermediate node 312 is associated with a snapshot having an identifier of "TreeID=1" and intermediate node 316 is associated with a snapshot having an identifier of "TreeID=2." A view of the snapshot tree may be traversed to determine one or more one or more chunk identifiers associated with new data chunks. The snapshot tree is traversed from the root node associated with the view to each of the leaf nodes of the snapshot tree. The identifier of each leaf node is compared to an identifier associated with the view.

In some embodiments, in the event the leaf node stores a chunk identifier and the identifier of the leaf node matches the identifier associated with the view, then the chunk identifier is determined to be associated with a new data chunk. In the event the leaf node stores a chunk identifier and the identifier of the leaf node does not match the identifier associated with the view, then the chunk identifier is not determined to be associated with a new data chunk.

In some embodiments, chunk identifiers associated with potentially new data chunks are sent to the storage site. A snapshot tree associated with a current view and a snapshot tree associated with a previous view are traversed. One or more leaf nodes shared between the snapshot tree associated with a current view and the snapshot tree associated with the previous view are determined. One or more leaf nodes that are not shared between the snapshot tree associated with the current view and the snapshot tree associated with the previous view are determined. The chunk identifiers associated with the one or more leaf nodes that are not shared between the snapshot tree associated with the current view and the snapshot tree associated with the previous view are identified. In some embodiments, in the event the leaf node stores a chunk identifier and the identifier of the leaf node is greater than the identifier associated with a previous view, then the chunk identifier is determined to be associated with a potential new data chunk. In the event the leaf node stores a chunk identifier and the identifier of the leaf node matches the identifier associated with the previous view, then the chunk identifier is not determined to be associated with a potential new data chunk.

At 524, chunk identifiers associated with new data chunks are sent to a storage site. The chunk identifiers may include a chunk identifier associated with each leaf node of a snapshot tree view, regardless of when the chunk with which the chunk identifier is associated, was added to a tree structure. For example, file tree 380 represents a file at time $t_2$. Root node 304 is associated with a view of the file tree at time $t_2$. Root node 304 is associated with leaf nodes 322, 324, 326, 330, 332. Leaf nodes 322, 324, 326, 330 are associated with a previous snapshot because they have an identifier associated with the previous snapshot. Leaf node 332 is associated with a different snapshot because it has an identifier associated with the different snapshot. The chunk identifiers associated with leaf node 332 may be sent to the storage site.

In some embodiments, a remote procedure call to the storage site is invoked. The remote procedure call may include the chunk identifiers associated with one or more snapshots. For example, the remote procedure call may include the chunk identifiers associated with leaf nodes 322, 324, 326, 330, 332.

A replication condition associated with a replication policy may have occurred. For example, a replication policy may indicate that a snapshot is to be replicated each time a new snapshot tree is added to the snapshot tree structure. The replication policy may indicate that a full snapshot and/or incremental snapshot of snapshot tree view is to be replicated. A full snapshot includes the data stored in each of the leaf nodes of a snapshot tree view, regardless of whether the leaf nodes of the snapshot tree view are shared with a previous snapshot tree view. An incremental snapshot includes data stored in one or more leaf nodes of a snapshot tree view that are not shared with a previous snapshot tree view. A leaf node is associated with a previous snapshot view if an identifier of the leaf node (e.g., TreeID) does not match an identifier associated with a snapshot tree view. A leaf node has an associated view identifier (e.g., TreeID) that identifies the snapshot tree view with which it is associated. A view of a snapshot tree has an associated identifier. In the event the leaf node view identifier is different than the snapshot view identifier, then the data chunk associated with the leaf node is not a new data chunk and its corresponding chunk identifier is not sent. In the event the leaf node view identifier is the same as the snapshot view identifier, then the data chunk associated with the leaf node is a new data chunk and its corresponding chunk identifier is sent.

At 526, a request for data chunks associated with chunk identifiers not stored at the storage site is received. The storage site may compare the sent chunk identifiers to a list of chunk identifiers corresponding to previously replicated data chunks. For example, at time $t_2$, a request may include a request for the data chunk associated with the chunk identifier "Hash 6" because that data chunk was not previously replicated at time $t_0$. In some embodiments, the one or more previously replicated data chunks are linked to the same snapshot tree as the current snapshot. In some embodiments, the one or more previously replicated data chunks are unrelated to the current snapshot (e.g., data chunks replicated by a different storage site or associated with a different snapshot tree).

In some embodiments, a result of the remote procedure call returns the data chunks that need to be sent to the storage site. For example, the result of the remote procedure call may indicate that the data chunk associated with the chunk identifier "Hash 6" is to be sent to the storage site.

At 528, the one or more requested data chunks corresponding to the chunk identifiers not previously stored by the storage site are provided.

Figure 5C:
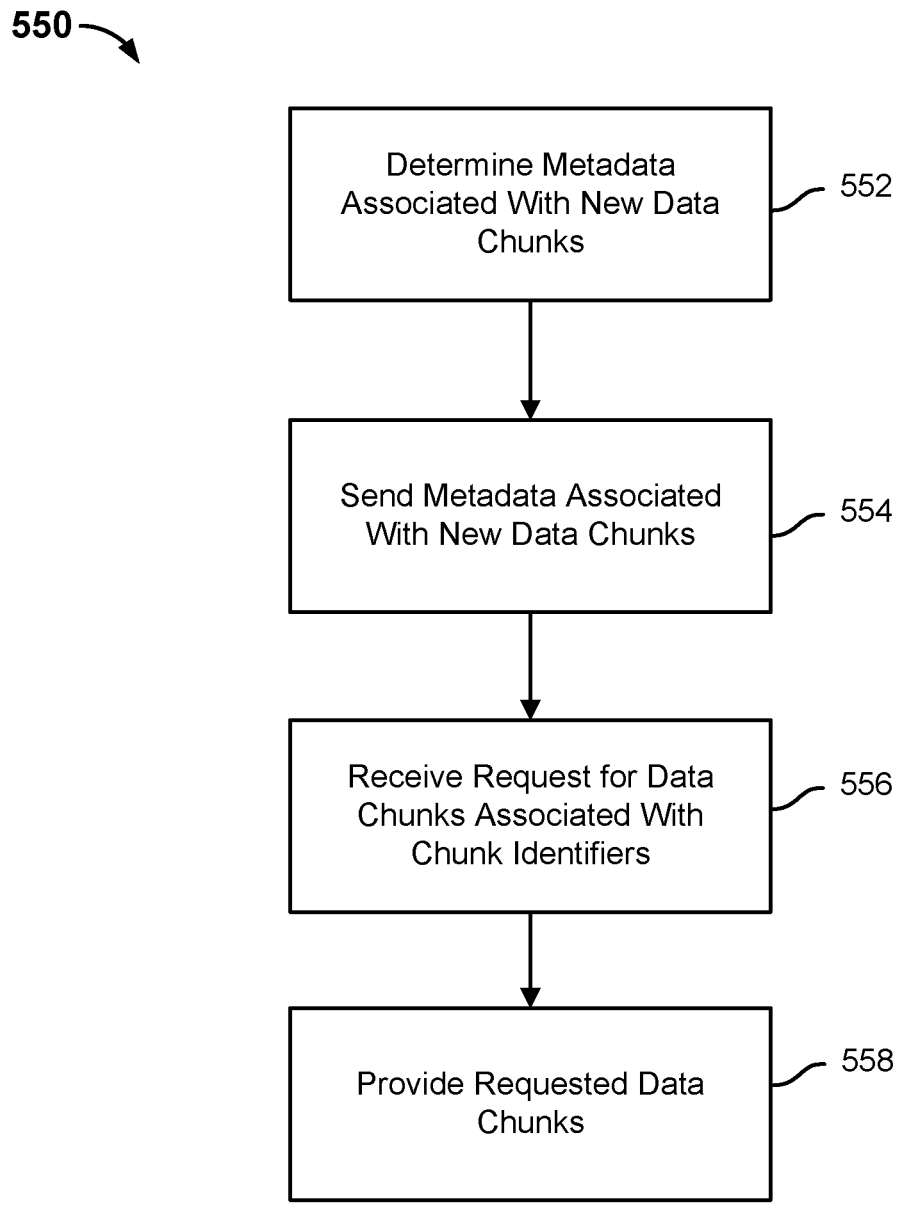
FIG. 5C is a flow chart illustrating an embodiment of a process for replicating data.

FIG. 5C is a flow chart illustrating an embodiment of a process for replicating data. In the example shown, process 550 may be implemented by a storage system, such as first storage site 112.

At 552, metadata associated with new data chunks is determined.

In some embodiments, a write to the file system data occurs such that a portion of a data chunk is overwritten with a new data chunk. As a result, the chunk identifier associated with the data chunk applies to a portion of the modified file system data and the chunk identifier associated with the new data chunk applies to the portion of the file system data that previously corresponded to the overwritten portion of the data chunk. To represent this modification to the file system data, a corresponding modification is made, as described with respect to FIG. 3E, to the snapshot tree. The metadata of a new leaf node may include the chunk identifier associated with the data chunk, a corresponding chunk offset that describes a portion of the data chunk with which the chunk identifier still applies, a chunk identifier associated with the new data chunk, and a corresponding chunk offset that describes the portion of the new data chunk with which the chunk identifier applies. In some embodiments, the metadata includes a file offset for each chunk identifier that identifies a portion of the file system data with which the chunk identifier applies and/or an offset length.

In other embodiments, a write to the file system data occurs such that a data chunk is replaced with a new data chunk. As a result, the chunk identifier associated with the data chunk no longer applies to a portion of the modified file system data and the chunk identifier associated with the new data chunk applies to the portion of the file system data that previously corresponded to the overwritten portion of the data chunk. To represent this modification to the file system data, a corresponding modification is made, to the snapshot tree. A new leaf node is added to the snapshot tree. The metadata of the new leaf node may include a chunk identifier associated with the new data chunk and a corresponding chunk offset that describes the portion of the new data chunk with which the chunk identifier applies. In some embodiments, the metadata includes a file offset for the chunk identifier associated with the new data chunk that identifies a portion of the file system data with which the new chunk identifier applies and/or an offset length.

A view of the snapshot tree may be traversed to determine metadata associated with new data chunks. The snapshot tree is traversed from the root node associated with the view to each of the leaf nodes of the snapshot tree. The view identifier of each leaf node is compared to a view identifier associated with the view. In the event the leaf node stores metadata and the view identifier of the leaf node matches the identifier associated with the view, then the metadata is determined to be associated with a new data chunk. In the event the leaf node stores metadata and the identifier of the leaf node does not match the identifier associated with the view, then the metadata is not determined to be associated with a new data chunk.

In some embodiments, a current view of the snapshot tree and a previous view of the snapshot tree may be traversed to determine metadata associated with potentially new data chunks. One or more leaf nodes shared between the snapshot tree associated with a current view and the snapshot tree associated with the previous view are determined. One or more leaf nodes that are not shared between the snapshot tree associated with the current view and the snapshot tree associated with the previous view are determined. The chunk identifiers associated with the one or more leaf nodes that are not shared between the snapshot tree associated with the current view and the snapshot tree associated with the previous view are identified as potential new data chunks.

In some embodiments, in the event the leaf node stores a chunk identifier and the identifier of the leaf node is greater than the identifier associated with a previous view, then the chunk identifier is determined to be associated with a potential new data chunk. In the event the leaf node stores a chunk identifier and the identifier of the leaf node matches the identifier associated with the previous view, then the chunk identifier is not determined to be associated with a potential new data chunk.

At 554, the metadata associated with the one or more new data chunks is sent to a storage site. In some embodiments, the metadata includes the chunk identifier associated with the data chunk and a corresponding chunk offset that describes a portion of the data chunk with which the chunk identifier still applies, a chunk identifier associated with the new data chunk, and a corresponding chunk offset that describes the portion of the new data chunk with which the chunk identifier applies. In some embodiments, the metadata includes a file offset for each chunk identifier that identifies a portion of the file system data with which the chunk identifier applies and/or a corresponding file offset length. In some embodiments, the metadata includes a chunk identifier associated with the new data chunk and a corresponding chunk offset that describes the portion of the new data chunk with which the chunk identifier applies and/or a corresponding chunk offset length.

In some embodiments, a remote procedure call to the storage site is invoked. The remote procedure call may include the chunk identifiers associated with one or more snapshots. For example, the remote procedure call may include the chunk identifiers associated with leaf nodes 322, 324, 326, 330, 332.

A replication condition associated with a replication policy may have occurred causing the metadata associated with the one or more new data chunks to be sent to the storage site. For example, a replication policy may indicate that a snapshot is to be replicated each time a new snapshot tree is added to the snapshot tree structure. The replication policy may indicate that a full snapshot and/or incremental snapshot of snapshot tree view is to be replicated. A full snapshot includes the data stored in each of the leaf nodes of a snapshot tree view, regardless of whether the leaf nodes of the snapshot tree view are shared with a previous snapshot tree view. An incremental snapshot includes data stored in one or more leaf nodes of a snapshot tree view that are not shared with a previous snapshot tree view. A leaf node is associated with a previous snapshot view if an identifier of the leaf node (e.g., TreeID) does not match an identifier associated with a view. A leaf node has an associated view identifier (e.g., TreeID) that identifies the view with which it is associated. A view of a snapshot tree has an associated identifier. In the event the leaf node view identifier is different than the snapshot view identifier, then the data chunk associated with the leaf node is not a new data chunk and its corresponding metadata is not sent. In the event the leaf node view identifier is the same as the snapshot view identifier, then the data chunk associated with the leaf node is a new data chunk and its corresponding metadata is sent.

At 556, a request for data chunks associated with chunk identifiers not stored at the storage site is received. The storage site may compare the sent chunk identifiers included in the metadata to a list of chunk identifiers corresponding to previously replicated data chunks. For example, at time $t_2$, a request may include a request for the data chunk associated with the chunk identifier "Hash 6" because that data chunk was not previously replicated at time $t_0$. In some embodiments, the one or more previously replicated data chunks are linked to the same snapshot tree as the current snapshot. In some embodiments, the one or more previously replicated data chunks are unrelated to the current snapshot (e.g., data chunks replicated by a different storage site or associated with a different snapshot tree).

In some embodiments, a result of the remote procedure call returns the data chunks that need to be sent to the storage site. For example, the result of the remote procedure call may indicate that the data chunk associated with the chunk identifier "Hash 6" is to be sent to the storage site.

At 558, the one or more requested data chunks corresponding to the chunk identifiers not previously stored by the storage site are provided.

Figure 6A:
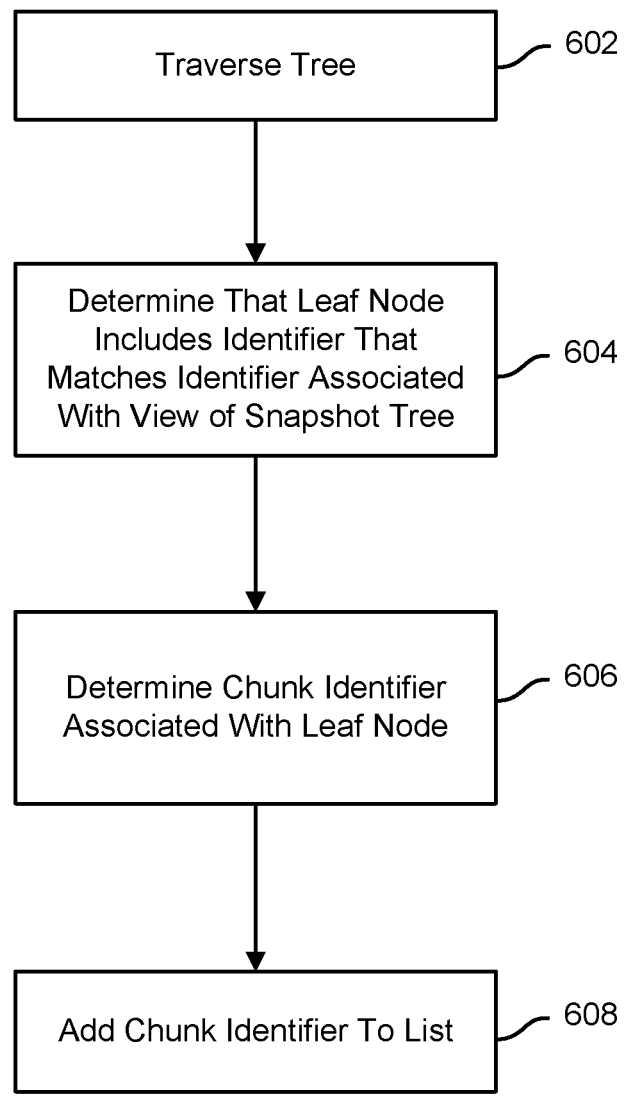
FIG. 6A is a flow chart illustrating an embodiment of a process for determining new chunks of data associated with a snapshot.

FIG. 6A is a flow chart illustrating an embodiment of a process for determining new chunks of data associated with a snapshot. In the example shown, process 600 may be implemented by a system, such as first storage site 112. Process 600 may be implemented to perform at least a part of steps 522 or 552.

At 602, a view associated with a snapshot tree is traversed. To determine whether a node is associated with a new chunk of data, file system manager starts at the root node associated with the view and traverses the snapshot tree. The file manager may traverse each branch of a view to determine one or more nodes associated with new chunks of data. At each node of the snapshot tree, the file system manager determines whether a view identifier associated with a node matches an identifier associated with the view of the snapshot tree. In the event the view identifier associated with a node matches the identifier associated with the view of the snapshot tree, file system manager proceeds to a node that the node having the matching identifier points. In the event the view identifier associated with a node does not match the identifier associated with the view of the snapshot tree, file system manager stops traversing the tree along that branch.

For example, a file system manager traversing file tree 380 would start at root node 304 because that is root node associated with the file tree at time $t_2$. The view of file tree 380 has a view identifier of "2." File tree 380 would be traversed from root node 304 to intermediate node 312. The file system manager would not continue traversing the tree from intermediate node 302 to any of the leaf nodes 322, 324, 326 because the "TreeID" of intermediate node 312 does not match the "TreeID" of root node 304, which is the identifier of the view at time $t_2$. Subsequently, the file system manager would restart the traversal and traverse the tree from root node 302 to intermediate node 316. The file system manager would continue traversing the tree from intermediate node 316 to leaf nodes 330, 332, because the "TreeID" of intermediate node 312 matches the "TreeID" of root node 304.

At 604, it is determined that a leaf node includes an view identifier that matches the identifier associated with a view of the snapshot tree. For example, the "TreeID" of leaf node 332 matches the "TreeID" of root node 304.

At 606, the chunk identifier associated with the leaf node is determined. In some embodiments, the leaf node stores the chunk identifier. In other embodiments, the leaf node stores a data chunk. A file system manager may query a metadata store to identify the chunk identifier with which the data chunk is associated.

At 608, the chunk identifier is added to a list of chunk identifiers. The list includes chunk identifiers associated with data chunks that were added to a snapshot tree since a previous snapshot.

Figure 6B:
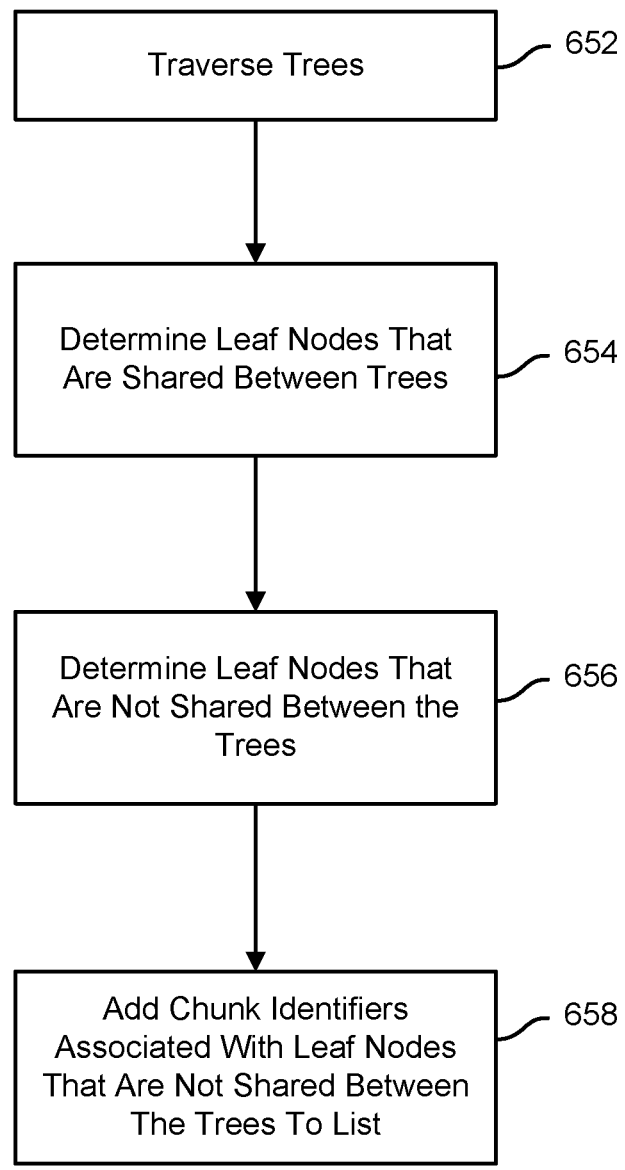
FIG. 6B is a flow chart illustrating an embodiment of a process for determining potentially new chunks of data associated with a snapshot.

FIG. 6B is a flow chart illustrating an embodiment of a process for determining potentially new chunks of data associated with a snapshot. In the example shown, process 650 may be implemented by a system, such as first storage site 112. Process 650 may be implemented to perform at least a part of steps 522 or 552.

At 652, a snapshot tree associated with a current view and a snapshot tree associated with a previous view are traversed. For example, snapshot tree structure 380 includes root node 302 and root node 304. The current view may be associated with root node 304 and the previous view may be associated with root node 302. The current view is traversed from root node 304 through intermediate nodes 312, 316 to leaf nodes 322, 324, 326, 330, 332. The previous view is traversed from root node 302 through intermediate nodes 312, 314 to leaf nodes 322, 324, 326, 328, 330.

At 654, one or more leaf nodes shared between the snapshot tree associated with a current view and the snapshot tree associated with the previous view are determined. For example, leaf nodes 322, 324, 326, 330 are shared between the current view and the previous view.

At 656, one or more leaf nodes that are not shared between the snapshot tree associated with the current view and the snapshot tree associated with the previous view are determined. For example, leaf nodes 328 and 332 are not shared between the current view and the previous view.

At 658, the chunk identifiers associated with the one or more leaf nodes that are not shared between the snapshot tree associated with the current view and the snapshot tree associated with the previous view are added to a list of chunk identifiers to be sent to a remote storage location. For example, "Hash 4" and "Hash 6" are added to the list of chunk identifiers.

Figure 7:
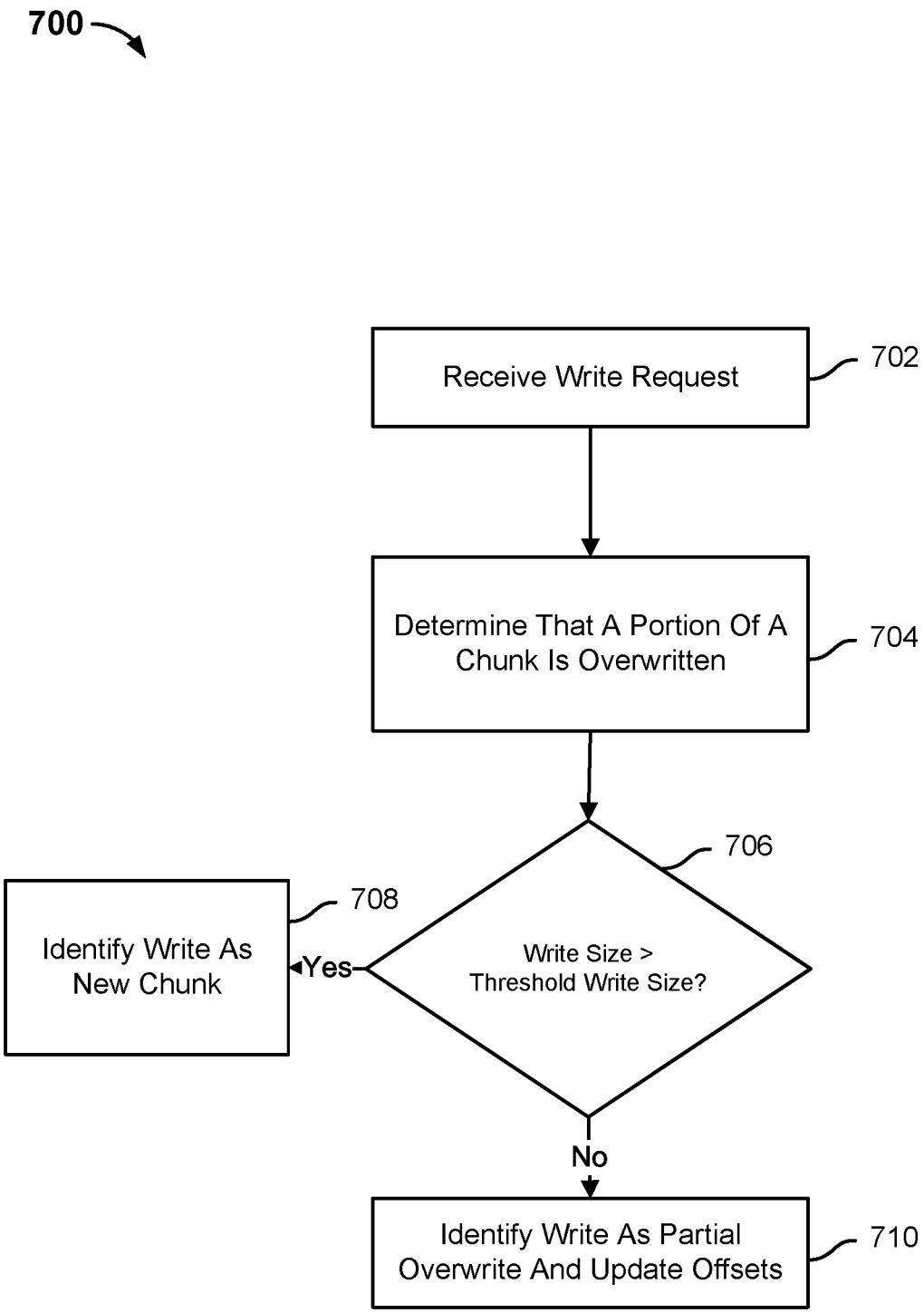
FIG. 7 is a flow chart illustrating an embodiment of modifying file system data.

FIG. 7 is a flow chart illustrating an embodiment of modifying file system data. In the example shown, process 700 may be implemented by a system, such as first storage site 112 or primary storage site 102.

At 702, a write request to modify file system data is received. The write may be a request to overwrite a portion of a data chunk of file system data.

At 704, it is determined that a portion of a data chunk has been overwritten.

At 706, it is determined whether the size of the write is greater than or equal to a threshold write size. In the event the write size is greater than or equal to the threshold size, process 700 proceeds to 708. This indicates that a data chunk has been replaced with a new data chunk. In the event the write size is less than the threshold write size, process 700 proceeds to 710. This indicates that a data chunk has been partially overwritten with a new data chunk.

At 708, the write is identified as a new data chunk. To represent this modification to the file system data, a corresponding modification is made to a current view of a snapshot in the snapshot tree. For example, as depicted in FIG. 3C, the value of data key "4" has been modified from "Hash 4" to "Hash 6." This indicates that the data chunk having a chunk identifier of "Hash 4" has been replaced with a data chunk having a chunk identifier of "Hash 6." A new leaf node is added to a current view of the snapshot tree. The leaf node stores a data key value pair of "4: Hash 6." This indicates that the data chunk having a chunk identifier of "Hash 4" has been replaced with a data chunk having a chunk identifier of "Hash 6."

At 710, the write is identified as a partial overwrite of the data chunk and offsets associated with the partial overwrite are updated. To represent this modification to the file system data, a corresponding modification is made to a current view of a snapshot in the snapshot tree. For example, as depicted in FIG. 3E, the value of data key "4" has been modified from "Hash 4, 0-199" to "Hash 4, 100-199; Hash 6, 0-99." A new leaf node is added to a current view of the snapshot tree. The leaf node stores a data key value pair of "Hash 4, 100-99; Hash 6, 0-99." This indicates that the data chunk having a chunk identifier of "Hash 4" has been partially replaced with a data chunk having a chunk identifier of "Hash 6." It also indicates that the chunk identifier of "Hash 4" applies to bytes "100-199" of the data chunk having a chunk identifier of "Hash 4" and the chunk identifier of "Hash 6" applies to bytes "0-99" of the data chunk having a chunk identifier of "Hash 6."

Figure 8:
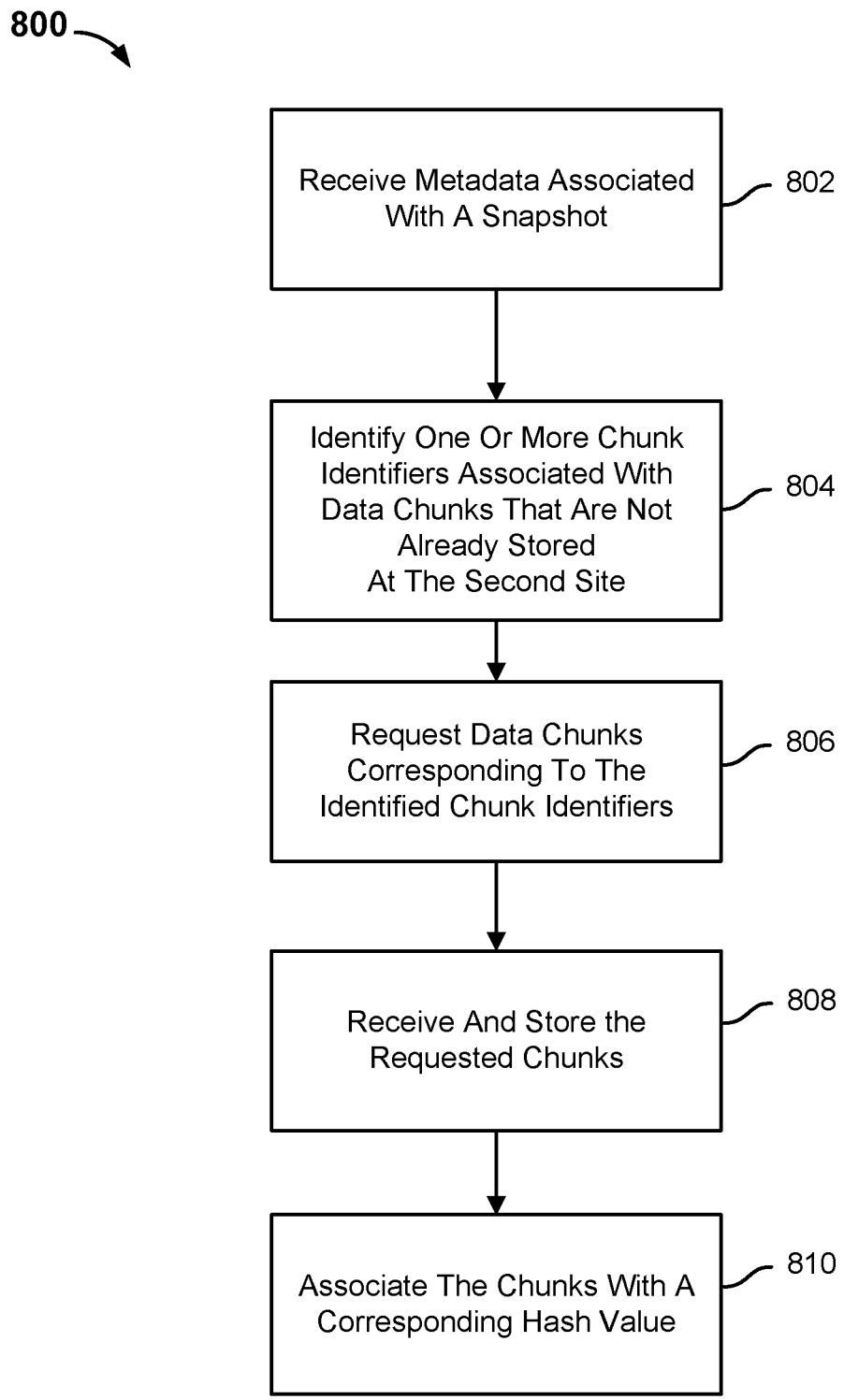
FIG. 8 is a flow chart illustrating an embodiment of a process for replicating data.

FIG. 8 is a flow chart illustrating an embodiment of a process for replicating data. In the example shown, process 800 may be performed by a storage system, such as second storage site 122.

At 802, metadata associated with a snapshot is received. The metadata may be received from a storage site, such as first storage site 112. The metadata may include a list of one or more chunk identifiers associated with one or more data chunks to be replicated. A chunk identifier corresponds to a data chunk. The chunk identifier uniquely identifies the contents of the data chunk.

In some embodiments, the metadata includes corresponding chunk identifiers associated with one or more data chunks that are associated with a view of a snapshot tree, regardless of when the data chunks were added to the version of file system data. For example, file tree 380 represents a version of the file system data at time $t_2$. The version of the file system data at time $t_2$ is associated with root node 304. The version of the file system data at time $t_2$ includes data chunks: "Chunk 1," "Chunk 2," "Chunk 3," "Chunk 5," and "Chunk 6." The received metadata may include the following corresponding chunk identifiers: "Hash 1," "Hash 2," "Hash 3," "Hash 5," and "Hash 6."

In some embodiments, the metadata includes corresponding chunk identifiers associated with one or more new data chunks that have not been previously replicated. For example, file tree 380 represents a version of the file system data at time $t_2$. The version of the file system data at time $t_2$ is associated with root node 304. The version of the file system data at time $t_2$ includes data chunks: "Chunk 1," "Chunk 2," "Chunk 3," "Chunk 5," and "Chunk 6." "Chunk 1," "Chunk 2," "Chunk 3," "Chunk 4," and "Chunk 5" are associated with a previous snapshot/version because leaf nodes 322, 324, 326, 328, and 330 have a TreeID that is associated with a previous snapshot/version of the file system data. "Chunk 6" is associated with a view of the file tree at time $t_2$ because leaf node 332 has a TreeID that is associated with the file tree at time $t_2$. The received metadata may include a chunk identifier of "Hash 6."

In some embodiments, the metadata includes a file offset associated with the chunk identifier, a file offset length, and/or a chunk offset associated with the chunk identifier. The file offset indicates a location of the file system data, i.e., a range of data blocks, with which the chunk identifier is associated. The file offset indicates a length of the data block to which the chunk identifier applies. The chunk offset indicates a portion of a data chunk with which the chunk identifier applies.

At 804, one or more chunk identifiers associated with data chunks that are not already stored at the second storage site are identified. Such a chunk identifier indicates that a data chunk corresponding to the chunk identifier has not been replicated to the data recovery storage system. For example, it may be determined that the one or more previously replicated snapshots is not associated with a data chunk having a hash value of "Hash 6."

The chunk identifiers included in the metadata may be compared to one or more chunk identifiers associated with the one or more previously replicated data chunks. A data structure (e.g., lookup table) in a metadata store may store a list that identifies a plurality of data chunks already stored at the second storage site, a location of the data chunks already stored at the second storage site, and the corresponding chunk identifiers associated with the data chunks already stored at the second storage site. In some embodiments, the one or more previously replicated data chunks are linked to the same snapshot tree as the current snapshot. In some embodiments, the one or more previously replicated data chunks are unrelated to the current snapshot (e.g., data chunks replicated by a different storage site or associated with a different snapshot tree).

At 806, one or more data chunks corresponding to the one or more identified chunk identifiers are requested. For example, the received metadata may indicate that a snapshot includes data blocks associated with chunk identifiers: "Hash 1," "Hash 2," "Hash 3," "Hash 4," "Hash 5," and "Hash 6." Data chunks associated with the chunk identifiers of "Hash 1," "Hash 2," "Hash 3," "Hash 4," and "Hash 5," may already be stored at the second storage site. Since the chunk identifier "Hash 6" and its associated data chunk has not been previously replicated, the data chunk associated with chunk identifier "Hash 6" may be requested.

At 808, the one or more requested data chunks may be received and stored in memory. For example, the data chunk associated with the chunk identifier "Hash 6" may be received and stored in memory.

At 810, the received data chunks may be associated with their corresponding chunk identifier. For example, a data structure comprising chunk identifiers and corresponding data chunks may be updated to reflect the newly replicated data blocks. For example, a metadata store at the storage site may include a list of chunk identifiers and associated data blocks. The list may be updated to reflect that the storage site includes a data chunk having a chunk identifier of "Hash 6." The list may be updated to reflect the corresponding offsets associated with the chunk identifiers.

Figure 9:
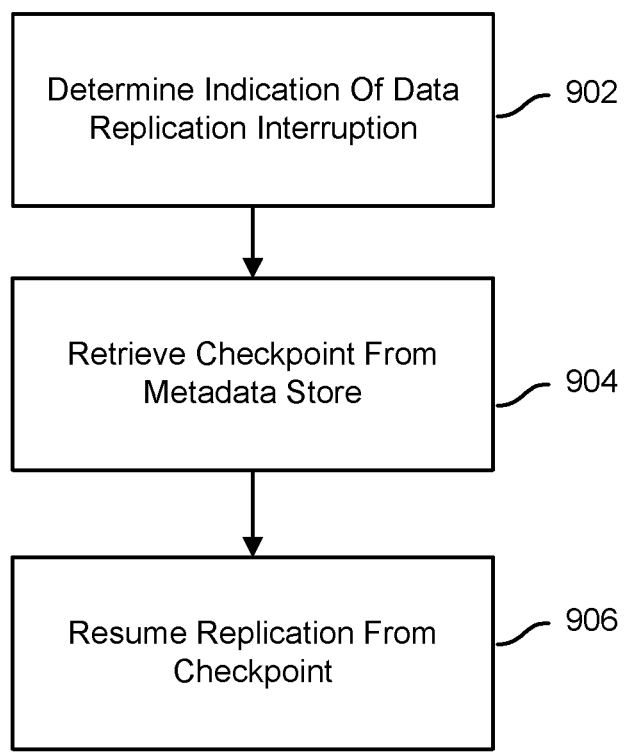
FIG. 9 is a flow chart illustrating an embodiment of a process for resuming an interrupted data replication instance.

FIG. 9 is a flow chart illustrating an embodiment of process for resuming an interrupted data replication instance.

In the example shown, process 900 may be implemented by a storage system, such as first storage site 112. Process 900 may be implemented to perform some of steps 508, 528, 558. A first storage site may be comprised of a plurality of storage nodes, such as nodes 111, 113, 117. A second storage site may be comprised of a plurality of storage nodes, such as nodes 121, 123, 127. The nodes of the first storage site, such as nodes 111, 113, 117, may start replicating data to a second storage site, such as nodes 121, 123, 127. The size of set of data chunks to replicate to a second storage site may be very large. Instead of one storage node transferring the set of data chunks by itself, the set of data chunks may be divided into subsets and the plurality of storage nodes may transfer the subsets of data chunks in parallel to the one or more storage nodes of second storage site. A storage node may be assigned one of the subsets of data chunks. Each subset of data chunks may be further divided into a plurality of batches. A batch is comprised a portion of the subset of data chunks. After a batch of chunks is transferred to the second storage site, the node that transferred the batch of chunks may provide a checkpoint to the metadata store of the storage site. After a transfer is complete, a status of a storage node may be updated to indicate that the storage node is available to assist other storages nodes in transferring the set of data chunks.

At 902, an indication of data replication interruption is determined. For example, a file system manager may assign a storage node with the task of transferring a batch of chunks to a storage site. During the transfer, the storage node may periodically provide a heartbeat signal to the file system manager. In the event the file system manager does not receive the heartbeat signal, it may determine that the storage node went offline, i.e, the data replication was interrupted.

In some embodiments, a replication application is distributed across the nodes at a storage site. The replication application includes a replication engine. One of the nodes at the storage site is elected a leader and the rest of the nodes are workers. Each of the workers provides a heartbeat signal to the leader node. In the event the leader node does not receive the heartbeat signal from a worker node, then the leader node may determine that worker node went offline, i.e., the data replication was interrupted.

At 904, a checkpoint is retrieved from a metadata store. After a batch of chunks is transferred to the second storage site, the node that transferred the batch of chunks may provide a checkpoint to the metadata store of the storage site. The checkpoint provides a last known state of the data replicated before the data replication interruption.

At 906, the replication is resumed from the checkpoint. The file system manager may assign another storage node of the storage site to resume the replication of the batch of chunks assigned to the offline node. The other storage node may resume the replication from the checkpoint.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of replicating data, comprising:
determining, by a source system, one or more corresponding data identifiers for each data chunk of a first group of data chunks of a first version of file system data;
representing the first version of the file system data in a first tree structure that references the determined one or more corresponding data identifiers;
representing a second version of the file system data in a second tree structure using at least a portion of elements of the first tree structure of the first version, wherein the second tree structure references at least one or more data identifiers associated with one or more data chunks of the second version of the file system data that are not included in the first version of the file system data;
identifying and sending from the source system to a destination system the at least one or more data identifiers associated with the one or more data chunks of the second version of the file system data that are not included in the first version of the file system data and corresponding chunk offsets for the at least one or more data identifiers associated with the one or more data chunks of the second version of the file system data that are not included in the first version of the file system data, wherein a chunk offset indicates a portion of the data chunk to which a data identifier applies, wherein the data chunk has a corresponding file offset of the file system data, wherein in response to receiving the at least one or more data identifiers associated with the one or more data chunks of the second version of the file system data that are not included in the first version of the file system data, the destination system:
  identifies the one or more data chunks corresponding to the at least one or more data identifiers associated with the one or more data chunks of the second version of the file system data that are not stored at the destination system based on the at least one or more data identifiers associated with the one or more data chunks of the second version of the file system data that are not included in the first version of the file system data and the corresponding chunk offsets for the at least one or more data identifiers associated with the one or more data chunks of the second version of the file system data that are not included in the first version of the file system data, and
  sends to the source system a response indicating which of the one or more data chunks corresponding to the at least one or more data identifiers associated with the one or more data chunks of the second version of the file system data that are not included in the first version of the file system data; and
receiving at the source system from the destination system the response indicating which of the one or more data chunks corresponding to the at least one or more data identifiers associated with the one or more data chunks of the second version of the file system data that are not included in the first version of the file system data are requested to be provided for replication.

2. The method of claim 1, further comprising sending to the destination system the one or more data chunks indicated in the response.

3. The method of claim 2, further comprising:
receiving an indication of an interruption associated with sending the one or more data chunks indicated in the response;
determining a checkpoint associated with the sending the one or more data chunks indicated in the response; and
resuming, based on the checkpoint, the sending of the one or more data chunks indicated in the response.

4. The method of claim 2, wherein one or more nodes are configured to send in parallel different portions of the one or more data chunks indicated in the response.

5. The method of claim 1, wherein sending the at least one or more data identifiers associated with the one or more data chunks of the second version of the file system data that are not included in the first version of the file system data includes sending a corresponding file offset associated with each of the one or more data identifiers.

6. The method of claim 1, wherein identifying the at least one or more data identifiers associated with the one or more data chunks of the second version of the file system data that are not included in the first version of the file system data includes traversing the second tree structure and the first tree structure.

7. The method of claim 6, further comprising determining one or more leaf nodes that are shared between the second tree structure and the first tree structure.

8. The method of claim 7, further comprising determining one or more leaf nodes that are not shared between the second tree structure and the first tree structure.

9. The method of claim 1, wherein a first node of the second tree structure corresponds to a modification to a particular data chunk of the first group corresponding to a second node of the first tree structure.

10. The method of claim 9, wherein the first node of the second tree structure is associated with a first data identifier of the modified particular data chunk and the second node of the first tree structure is associated with a second data identifier of the particular data chunk.

11. The method of claim 9, wherein the first node of the second tree structure is associated with a first data identifier of the modified particular data chunk and a second data identifier is associated with the first version of the particular data chunk.

12. The method of claim 1, wherein at least one node of the second tree structure references at least one node of the first tree structure.

13. The method of claim 1, wherein the first tree structure comprises a root node, one or more intermediate nodes, and one or more leaf nodes.

14. The method of claim 13, wherein at least one of the one or more leaf nodes stores the one or more data identifiers associated with one or more data chunks of the second version of the file system data that is not included in the first version of the file system data.

15. The method of claim 1, wherein a remote site is configured to receive the at least one or more data identifiers associated with the one or more data chunks of the second version of the file system data that are not included in the first version of the file system data and is configured to store the one or more data chunks that correspond to the at least one of the one or more data identifiers, wherein the one or more data chunks that correspond to the at least one of the one or more data identifiers is associated with the second version of the file system data that is different than the first version of the file system data.

16. A system for replicating data, comprising:
a processor; and
a memory coupled to the processor configured to provide the processor with instructions, which when executed cause the processor to:
  determine one or more corresponding data identifiers for each data chunk of a first group of data chunks of a first version of file system data;
  represent the first version of the file system data in a first tree structure that references the determined one or more corresponding data identifiers;
  represent a second version of the file system data in a second tree structure using at least a portion of elements of the first tree structure of the first version, wherein the second tree structure references at least one or more data identifiers associated with one or more data chunks of the second version of the file system data that are not included in the first version of the file system data;
  identify and send from the system to a destination system the at least one or more data identifiers associated with the one or more data chunks of the second version of the file system data that are not included in the first version of the file system data and corresponding chunk offsets for the at least one or more data identifiers associated with the one or more data chunks of the second version of the file system data that are not included in the first version of the file system data, wherein a chunk offset indicates a portion of the data chunk to which a data identifier applies, wherein the data chunk has a corresponding file offset of the file system data, wherein in response to receiving the at least one or more data identifiers associated with the one or more data chunks of the second version of the file system data that are not included in the first version of the file system data, the destination system is configured to:

identify the one or more data chunks corresponding to the at least one or more data identifiers associated with the one or more data chunks of the second version of the file system data that are not stored at the destination system based on the at least one or more data identifiers associated with the one or more data chunks of the second version of the file system data that are not included in the first version of the file system data and the corresponding chunk offsets for the at least one or more data identifiers associated with the one or more data chunks of the second version of the file system data that are not included in the first version of the file system data, and sends to the system a response indicating which of the one or more data chunks corresponding to the at least one or more data identifiers associated with the one or more data chunks of the second version of the file system data that are not included in the first version of the file system data; and receive from the destination system the response indicating which of the one or more data chunks corresponding to the at least one or more data identifiers associated with the one or more data chunks of the second version of the file system data that are not included in the first version of the file system data are requested to be provided for replication.

17. The system of claim 16, wherein the processor is further configured to send to the destination system the one or more data chunks indicated in the response.

18. The system of claim 16, wherein to identify the at least one or more data identifiers associated with the one or more data chunks of the second version of the file system data that are not included in the first version of the file system data, the processor is further configured to traverse the second tree structure.

19. A computer program product for replicating data, the computer program product being embodied in a non-transitory computer readable storage medium and comprising computer instructions for:

determining, by a source system, one or more corresponding data identifiers for each data chunk of a first group of data chunks of a first version of file system data;

representing the first version of the file system data in a first tree structure that references the determined one or more corresponding data identifiers;

representing a second version of the file system data in a second tree structure using at least a portion of elements of the first tree structure of the first version, wherein the second tree structure references at least one or more data identifiers associated with one or more data chunks of the second version of the file system data that are not included in the first version of the file system data;

identifying and sending from the source system to a destination system the at least one or more data identifiers associated with the one or more data chunks of the second version of the file system data that are not included in the first version of the file system data and corresponding chunk offsets for the at least one or more data identifiers associated with the one or more data chunks of the second version of the file system data that are not included in the first version of the file system data, wherein a chunk offset indicates a portion of the data chunk to which a data identifier applies, wherein the data chunk has a corresponding file offset of the file system data, wherein in response to receiving the at least one or more data identifiers associated with the one or more data chunks of the second version of the file system data that are not included in the first version of the file system data, the destination system:

identifies the one or more data chunks corresponding to the at least one or more data identifiers associated with the one or more data chunks of the second version of the file system data that are not stored at the destination system based on the at least one or more data identifiers associated with the one or more data chunks of the second version of the file system data that are not included in the first version of the file system data and the corresponding chunk offsets for the at least one or more data identifiers associated with the one or more data chunks of the second version of the file system data that are not included in the first version of the file system data, and sends to the source system a response indicating which of the one or more data chunks corresponding to the at least one or more data identifiers associated with the one or more data chunks of the second version of the file system data that are not included in the first version of the file system data; and receiving at the source system from the destination system the response indicating which of the one or more data chunks corresponding to the at least one or more data identifiers associated with the one or more data chunks of the second version of the file system data that are not included in the first version of the file system data are requested to be provided for replication.

\* \* \* \* \*

UNITED STATES PATENT AND TRADEMARK OFFICE
CERTIFICATE OF CORRECTION

PATENT NO. : 10,747,778 B2  
APPLICATION NO. : 15/664738  
DATED : August 18, 2020  
INVENTOR(S) : Anirvan Duttagupta, Apurv Gupta and Dinesh Pathak Page 1 of 1

It is certified that error appears in the above-identified patent and that said Letters Patent is hereby corrected as shown below:

In Column 6, Line(s) 63, after "time", delete "$t_0$" and insert --to--, therefor.

Signed and Sealed this  
Eighth Day of December, 2020

Andrei Iancu  
*Director of the United States Patent and Trademark Office*